(12) United States Patent
Kaufman et al.

(10) Patent No.: US 11,830,208 B2
(45) Date of Patent: Nov. 28, 2023

(54) ROBUST SURFACE REGISTRATION BASED ON PARAMETERIZED PERSPECTIVE OF IMAGE TEMPLATES

(71) Applicant: INTEL CORPORATION, Santa Clara, CA (US)

(72) Inventors: Itay Kaufman, Tel Aviv (IL); Or Weiser, Tel Aviv (IL)

(73) Assignee: Intel Corporation, Santa Clara, CA (US)

(*) Notice: Subject to any disclaimer, the term of this patent is extended or adjusted under 35 U.S.C. 154(b) by 653 days.

(21) Appl. No.: 16/829,995

(22) Filed: Mar. 25, 2020

(65) Prior Publication Data

US 2020/0226771 A1 Jul. 16, 2020

(51) Int. Cl.
| | |
|---|---|
| *G06T 7/33* | (2017.01) |
| *G06T 7/90* | (2017.01) |
| *G06T 3/60* | (2006.01) |
| *G06T 3/20* | (2006.01) |
| *G06T 7/37* | (2017.01) |
| *G06T 7/136* | (2017.01) |

(Continued)

(52) U.S. Cl.
CPC ............ *G06T 7/337* (2017.01); *G06T 3/0075* (2013.01); *G06T 3/20* (2013.01); *G06T 3/602* (2013.01); *G06T 7/136* (2017.01); *G06T 7/194* (2017.01); *G06T 7/37* (2017.01); *G06T 7/90* (2017.01); *G06T 2207/20041* (2013.01); *H04N 23/90* (2023.01)

(58) Field of Classification Search
CPC ......... G06T 7/337; G06T 7/136; G06T 7/194; G06T 7/37; G06T 7/90; G06T 7/35; G06T 7/30; G06T 3/0075; G06T 3/20; G06T 3/602; G06T 2207/20041; G06T 2207/10024; G06T 2207/20076; G06T 2207/30228; G06T 2207/20104; H04N 23/90

See application file for complete search history.

(56) References Cited

U.S. PATENT DOCUMENTS

| | | | |
|---|---|---|---|
| 2005/0190966 A1* | 9/2005 | Etienne-Cummings | .................... H04N 23/84 382/209 |
| 2013/0129205 A1* | 5/2013 | Wang | ..................... G06T 7/194 382/164 |

(Continued)

FOREIGN PATENT DOCUMENTS

WO 2017132766 8/2017

OTHER PUBLICATIONS

Puy et al., Robust image reconstruction from multi-view measurements. (Year: 2013).*

(Continued)

*Primary Examiner* — John B Strege
(74) *Attorney, Agent, or Firm* — Essential Patents Group, LLP

(57) ABSTRACT

Techniques related to performing image registration are discussed. Such techniques include converting a source image region and a target image portion from a color image space to a semantic space and iteratively converging homography parameters using the source image region and target image portion in the semantic space by applying iterations with some homography parameters allowed to vary and others blocked from varying and subsequent iterations with all homography parameters allowed to vary.

20 Claims, 9 Drawing Sheets

(51) Int. Cl.
*G06T 7/194* (2017.01)
*G06T 3/00* (2006.01)
*H04N 23/90* (2023.01)

(56) References Cited

U.S. PATENT DOCUMENTS

2013/0266218 A1* 10/2013 Jin ................ H04N 17/002
            382/165
2018/0033155 A1* 2/2018 Jia ................ G06T 3/0093
2019/0139228 A1* 5/2019 Park ............... G06T 7/143

OTHER PUBLICATIONS

Extended European Search Report for European Patent Application No. 20216321.8, dated Jun. 9, 2021.
Lu, Wei-Lwun, et al., "Learning to Track and Identify Players from Broadcast Sports Videos", IEEE Transactions on Pattern Analysis and Machine Intelligence, IEEE Computer Society, USA, vol. 35, No. 7, Jul. 1, 2013.

* cited by examiner

301

302

ROBUST SURFACE REGISTRATION BASED ON PARAMETERIZED PERSPECTIVE OF IMAGE TEMPLATES

BACKGROUND

In immersive video and other contexts such as computer vision applications, a number of cameras are installed around a scene of interest. For example, cameras may be installed in a stadium around a playing field. Using video attained from the cameras, a point cloud volumetric model representative of the scene is generated. A photo realistic view from a virtual view within the scene may then be generated using a view of the volumetric model which is painted with captured texture. Such views may be generated in every moment to provide an immersive experience for a user. Furthermore, the virtual view can be navigated in the 3D space to provide a multiple degree of freedom experience.

Prior to real time capture (e.g., before a game), calibration of the cameras is performed, which is an important step in providing a high quality user experience. Such calibration can be challenging due to a variety of factors including scene conditions that cause difficulty in image registration (e.g., transforming different image data to a shared coordinate system). For example, imaging conditions characterized as oblique natural planar images (ONPI) are relatively common and include one or more of an oblique view (e.g., <22° from horizon), colors that vary according to view point, low features quantity, uneven distribution of features, repetitive scenes, and a curved plane. Such conditions are not unique to sporting events and occur in other contexts such as autonomous driving, satellite imaging, and others.

Current techniques for registration include feature matching and template matching.

Current feature matching approaches include SIFT (scale-invariant feature transform) and SURF (speeded up robust features) techniques, which attempt to detect a point of interest and extract a feature vector using a certain area around the pixel. Matching is then done by attempting to find corresponding pairs of these features in pairs of images. Using such techniques to register two images applies a brute force search for pairs of matches for sparse sets of points described by the extracted feature vectors. In any natural image, given a small patch, there are likely many similar patches residing in the image (e.g., grass, sky, leaves, camouflage patterns, etc.) and even more so in the sports arena domain (e.g., stadium chairs, symmetric field markings, etc.). Given these recurring small-scale structures, finding a distinct match (i.e. associating only one point to a certain quarry point) becomes improbable with a rise in the number of detected points in the images. In addition, under an oblique setting, very different projections on to the image plane in different viewpoints are generated and, while most state-of-the-art feature extraction methods attempt to be invariant to translation, rotation and even affine transformations, all seem to fail under such drastic perspective distortions. Finally. feature matching approaches disadvantageously apply a two-stage algorithm—first detection in two images and then matching the two bags of detected points. However, there is no guarantee that the same point was indeed detected in both images, meaning some detections might not even have a match even though the point is visible in both images.

Template matching approaches, such as ECC (enhanced cross correlation), attempt to find a perspective transformation between two images or image patches. This can be done using a brute force search or by optimizing the perspective using a pre-known initial guess. Such techniques may include either trying to find a single perspective transform for the entire image or detecting interesting points in one image and attempting to find the perspective transform mapping a local region around the point detected in the source to the target image. A transformation of a patch in an image cannot be solved globally as there are many global minima for the patch in the entire image, so an initial guess is needed as a starting point. Notably, current techniques require a very good initial guess to converge, but if such initial guess were available, it would make the process unneeded to begin with. Furthermore, directly estimating a perspective transform from image patches requires a photo-consistency measure that does not hold in general for large baseline cases with un-controlled lighting (e.g., natural images in the outdoors).

It is desirable to provide image registration in a variety of contexts including oblique natural planar images and others. It is with respect to these and other considerations that the present improvements have been needed. Such improvements may become critical as the desire to provide new and immersive user experiences in imaging and video becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
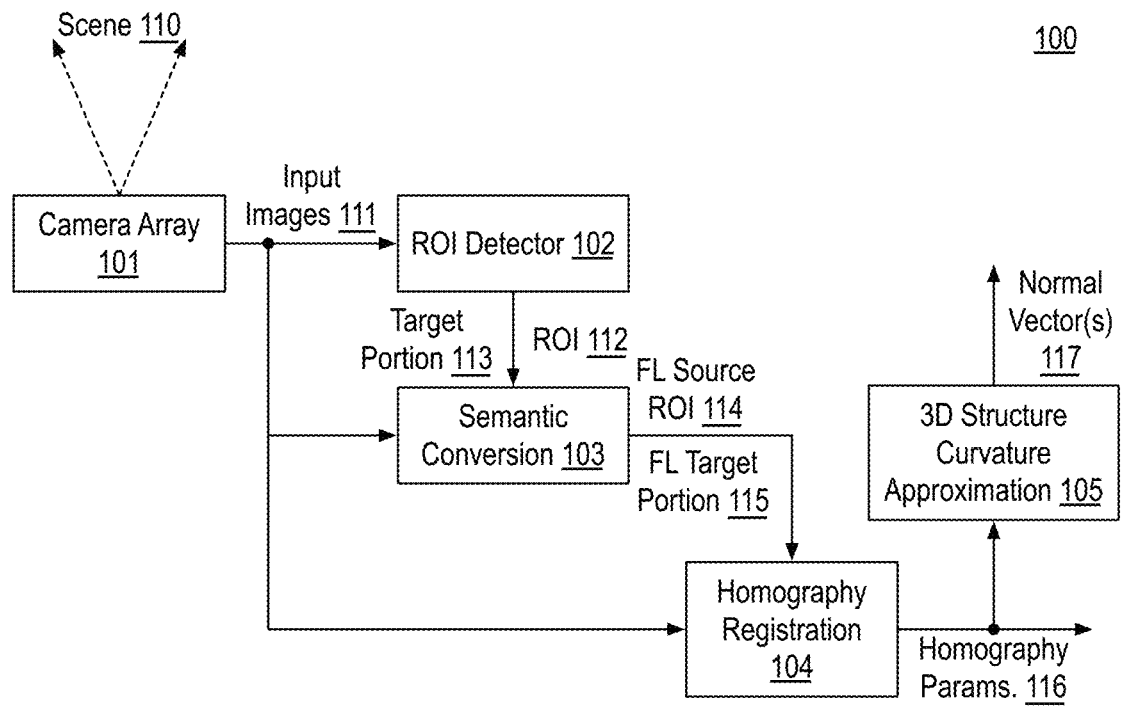
FIG. 1 illustrates an example apparatus for performing image registration.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within ±10% of a target value. For example, unless otherwise specified in the explicit context of their use, the terms "substantially equal," "about equal" and "approximately equal" mean that there is no more than incidental variation between among things so described. In the art, such variation is typically no more than ±10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to performing image registration to provide mapping parameters between a region of interest in a source image to a matched image region in a target image including perspective (homography) mapping.

As described above, it may be advantageous to perform such image registration in the context of immersive video applications and other applications such as computer vision. However, such registration may be performed in any context. Such registration techniques generate local mapping parameters between a region of interest in a source image (e.g., a source image region of interest) to a matched image region in a target image. Notably, the matched image region in the target image may be from an image patch (larger than the source image region) that is expected to include a shared view of the source image region of interest. The mapping parameters then map between the source image region of interest and the target region thereby may transform the image regions between the coordinate systems of the cameras used to attain the source and target images and/or to a shared coordinate system (e.g., a coordinate system shared by the cameras and, optionally, any number of additional cameras). Such mapping parameters may be considered local homography parameters as they map image regions (and not an entirety of an image). Highly accurate homography parameters are critical in many imaging and video contexts including calibration of cameras for immersive video, and many others. The techniques are discussed herein with respect to immersive video but may find application in a variety of contexts such as computer vision and others.

In some embodiments, a color region of interest (ROI) from a source image and a color image portion from a target image are received. In this context, the source image may be a reference image for image registration and the target image is an image in which matches of the color ROI are being sought. The color image portion may be larger than the color ROI and a search for a matching region and homography parameters to map between the ROI and the matching regions is an object of the registration process. In some embodiments, the color ROI and image portion are converted to a semantic space for improved matching. As used herein, the term semantic indicates pixels are provided values based on the likelihood they are part of a class such as a foreground class and a background class of an image or image portion.

Notably, given a color ROI (from a source image) to be detected and mapped to in a target image, the center of a matching region in the target image (as well as homography parameters to map therebetween) is the object of the registration and mapping. An assumption may be made that there is a function, $\phi$, that maps points of the ROI (points of a surrounding area of the ROI center) in the source image, $I_s(x)$, to points (that define a target region) in the target image, $I_t(y)$. For example, function, $\phi$, may be a full 8 DOF (degree of freedom) perspective (homograph, H) or any degenerate form of it. The mapping may then be defined as shown in Equations (1):

$$y=\phi(x;p)$$
$$p \in \mathbb{R}^8 \qquad (1)$$

where function, $\phi$, maps source image points, p, surrounding source ROI center, x, to target image points around target matched region, y.

As discussed, the objective is to find values of p, assuming an initial estimation, $\tilde{p}$, is given (e.g., an initial guess). For example, function, $\phi$, may map between the patches when the following is satisfied as shown in Equations (2):

$$I_s(x)=\Psi(I_t(y);\alpha)=\Psi(I_t(\phi(x;p));\alpha)$$
$$x \in \Omega_{patch} \qquad (2)$$

where $I_s(x)$ and $I_t(y)$ are the pixel color at a given image coordinate and $\Psi(\cdot)$ is a color correction function with a parametric definition, $\alpha$.

In such contexts, a solution may be sought that minimizes a cost function as provided in Equation (3):

$$Q = \operatorname*{argmin}_{p,\alpha} \sum_{x \in patch} \frac{1}{2} \|I_s(x) - \Psi(I_t(\phi(x;p));\alpha)\|^2 \qquad (3)$$

where Q is the overall cost.

However, determining a solution for color correction function, $\Psi(\cdot)$, or even modeling the function is unworkable in some contexts, particularly imaging conditions including oblique natural planar images (ONPI) that include one or more of an oblique view (e.g., <22° from horizon), colors that vary according to view point, low features quantity, uneven distribution of features, repetitive scenes, and a curved plane. In those or other imaging contexts, physical effects that the color change between the images and to be modeled by the color correction function including object texture, object material, light sources, light occlusions (e.g., shadows) and others make use of the color correction function unworkable.

Due to such obstacles, in some embodiments, the color ROI from the source image and the color image portion from the target image are converted to a foreground likelihood ROI and a foreground likelihood image portion including a likelihood each pixel is a foreground pixel. Such conversion may be performed using any suitable technique or techniques such as semantic segmentation using a neural network (NN) or Gaussian mixture model (GMM) or thresholding and distance transform techniques as discussed further herein. Notably, such a conversion avoids modeling of the color correction by use of a semantic image space. Determination of homography parameters that map between the foreground likelihood ROI and the foreground likelihood image portion is then provided using a number of iterations to converge the homography parameters. Although discussed herein with respect to foreground likelihood, any semantic binary separation may be used. Such pixel values may be characterized as semantic pixel values, semantic likelihood pixel values, or the like. A number of first iterations allow variation in translation parameters of the homography parameters and block variation in rotation parameters and perspective parameters of the homography parameters while a number of second iterations, subsequent to the first iterations, allow variation in the translation parameters, the rotation parameters, and the perspective parameters. Such techniques provide for more efficient convergence and less likelihood of creating unwanted saddle points in the homography parameter space. Allowing variation in some homography parameters and blocking variation in other homography parameters may be implemented using regularization parameters applied via a regularizing matrix, as discussed further herein.

In addition or in the alternative, in any iterations in the iterative mapping parameters convergence, a trust region parameter may be implemented with the regularization parameters. The trust region parameter provides a parameter to influence or alter a step size in the change in the mapping parameters at a particular iteration with a larger trust region parameter providing a greater step in gradient decent. In some embodiments, a change in the mapping parameters (e.g., a delta) is generated using a current trust region parameter and a first order approximation of an error function that generates an error between the source and target regions based on the mapping parameters. A first approximation of the change in error is then generated using the first order approximation and the real error function is used. Notably, the change in mapping parameters may reduce the cost in the first order approximation but not necessarily in the real function. A ratio of the change in error generated using the real function to the change in error generated using the first order approximation is then generated. Using the ratio, a decision is made with respect to a subsequent iteration such that, (a) when the ratio exceeds a large threshold, the trust region parameter is increased and the current iteration is repeated, (b) when the ratio exceeds a medium threshold and the change in homography parameters reduces overall cost, the change in mapping parameters is used at a subsequent iteration and the trust region parameter is not changed at the subsequent iteration, and (c) when the ratio is less than a low threshold or the change in mapping parameters increases overall cost, the trust region parameter is decreased and the current iteration is repeated.

The techniques discussed herein provide for high quality registration for any images and even in the context of oblique natural planar images. Such techniques include parametric template matching that can generate matches with sub-pixel accuracy. In some embodiments, the generation of the converged homography parameters may be used to estimate plane curvature of objects (e.g., a playing field) in the scene. Such highly accurate plane curvature estimations are advantageous in the context of smooth plane reconstruction, which may be used in 3D point cloud generation and other modeling efforts. The disclosed techniques include convert patches (e.g., ROIs and target image portions) to a less noisy semantic space other than the color (e.g., RGB) image space, determining perspective transformations (e.g., homography parameters) to map detected patches (e.g., ROIs) to matched patches in one or more other images, and optionally estimate normal vectors of 3D structure(s) in the scene (e.g., the curvature of a sports field). Many applications require understanding scene structure such as autonomous driving, robot navigation/interaction with the surroundings, and full 3D reconstruction for creating three dimensional videos in immersive video. A main task required when reconstructing a 3D structure (sparse or dense) is image registration under difficult imaging (e.g., ONPI) conditions. The techniques discussed herein allow registration of images under severe ONPI conditions and advantageously avoid inconsistency of detections under strong perspective deformations and ensure each detection will have a match in a wide range of images.

FIG. 1 illustrates an example apparatus 100 for performing image registration, arranged in accordance with at least some implementations of the present disclosure. As shown in FIG. 1, apparatus 100 may include a camera array 101, a ROI detector 102, a semantic conversion module 103, a homography registration module 104, and a 3D structure curvature approximation module 105. Apparatus 100 may be implemented in any suitable form factor device or one or more of such devices including a server computer, a cloud computing environment, personal computer, a laptop computer, a tablet, a phablet, a smart phone, a gaming console, a wearable device, a display device, an all-in-one device, a two-in-one device, or the like. Notably, in some embodiments, camera array 101 may be implemented separately from a device implementing the remaining components of apparatus 100. The images captured via camera array 101, input images 111, include simultaneously captured images of a scene 110. As used herein, the term simultaneously captured images indicates images that are synchronized to be captured at the same or nearly the same time instance within a tolerance such as 0.1 second. In some embodiments, the captured images are captured as synchronized captured video. For example, the components of apparatus 100 may be incorporated into any multi-camera multi-processor system to deliver immersive visual experiences for viewers of a scene.

Figure 2:
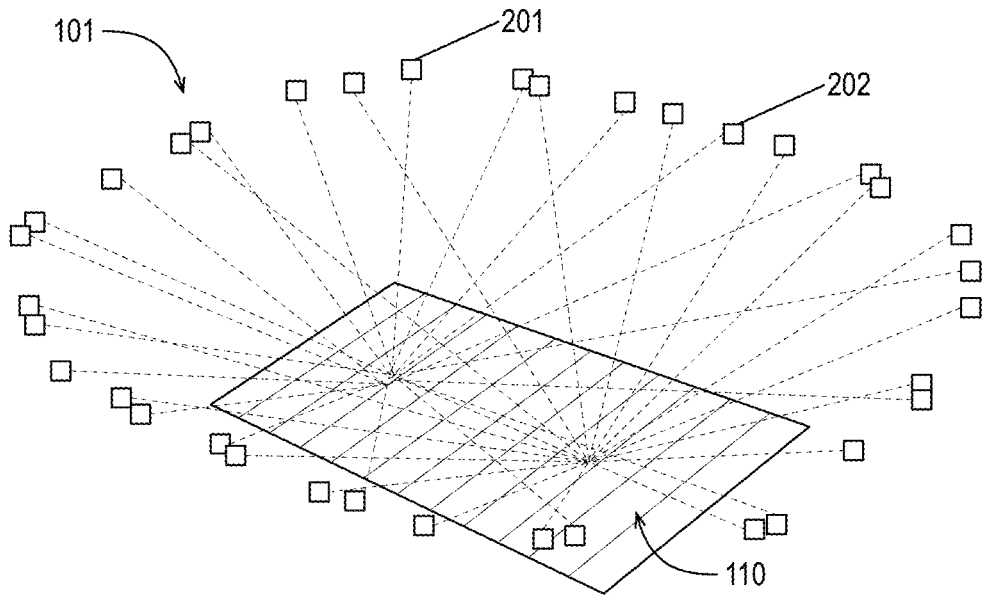
FIG. 2 illustrates an example camera array trained on an example scene.

FIG. 2 illustrates an example camera array 101 trained on an example scene 110, arranged in accordance with at least some implementations of the present disclosure. In the illustrated embodiment, camera array 101 includes 36 cameras trained on a sporting field. However, camera array 101 may include any suitable number of cameras trained on scene 110 such as not less than 20 cameras. For example, camera array 101 may be trained on scene 110 to generate a 3D model of scene 110 and fewer cameras may not provide adequate information to generate the 3D model. Camera array 101 may be mounted to a stadium (not shown) surrounding the sporting field of scene 110 and along the ground surrounding the sporting field, calibrated, and trained on scene 110 to capture simultaneous images or video. As shown, each camera of camera array 101 has a particular view of scene 110. For example, camera 201 has a first view of scene 110 and camera 202 has a second view of a scene and so on. As used herein, the term view indicates the image content of an image plane of a particular camera of camera array 101 or image content of any view from a virtual camera located within scene 110. Notably, the view may be a captured view (e.g., a view attained using image capture at a camera) such that multiple views include representations of the same person, object, entity, etc. The techniques discussed herein are used to register portions, regions, or patches of input images 111 attained using cameras of camera array 101. Input images 111 may have any suitable color image data structure. In some embodiments, input images 111 comprises RGB color image data.

Returning to FIG. 1, ROI detector 102 receives input images 111 and generates any number of regions of interest (ROI) 112 within any number of source images of input images 111. As used herein, the term source image indicates an image having an ROI that is to be matched in a target image. ROI detector 102 may detect ROI 112 using any suitable technique or techniques. Typically, ROI 112 include one or more foreground objects having number of features such as edges, corners, etc. As used herein, the term foreground indicates an object or pixel including a feature or features that provide separation or distinction with respect to a background, which does not include such features. Herein, such foreground objects and pixels are illustrated as markings on a sporting field; however, any such features may be employed. Furthermore, ROI detector 102 generates, for each ROI 112, a corresponding target portion 113 of one or more target images that are expected to include a match for each ROI 112. Notably, a match for the same ROI 112 may be found among multiple target images. Typically, target portion 113 is larger than ROI 112 such that homography parameters may translate, rotate, and alter the perspective of ROI 112 within target portion 113 to generate converged homography parameters.

Figure 3:
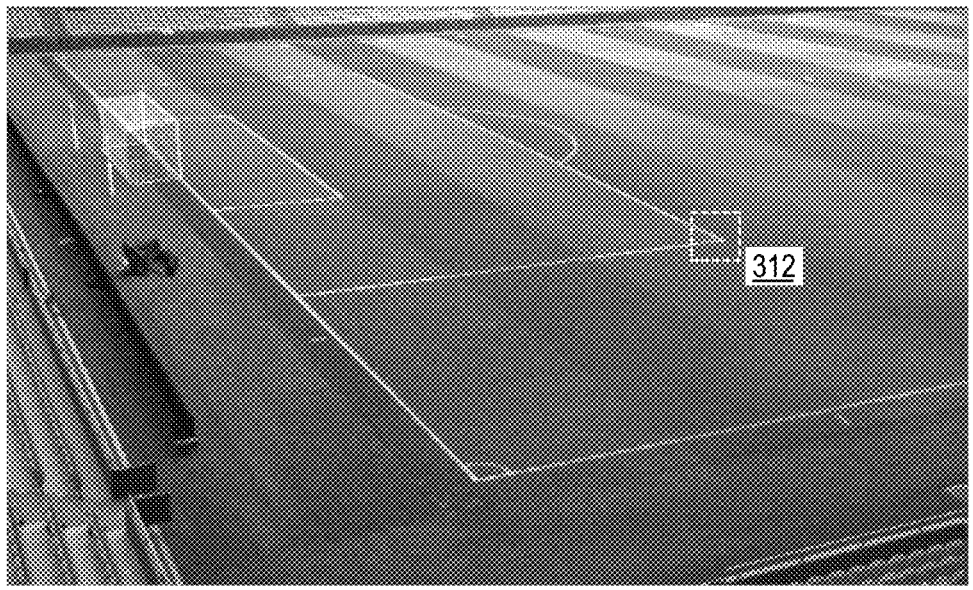
FIG. 3 illustrates an exemplary source image, including an example region of interest, and an exemplary target image, including an example target portion.
Figure 3:

FIG. 3 illustrates an exemplary source image 301, including an example region of interest 312, and an exemplary target image 302, including an example target portion 313, arranged in accordance with at least some implementations of the present disclosure. For example, source image 301 and target image 302 may be exemplary input images 111 attained from different cameras of camera array 101 substantially simultaneously. As shown, ROI detector 102 may detect, within source image 301, an example region of interest 312. ROI detector 102 may detect any number of regions of interest in source image 301. As shown, region of interest 312 includes notable features such as edges and corners that may be advantageous in image patch registration. Furthermore, ROI detector 102 may detect, within target image 302, an example target portion 313 that is expected to include a match to region of interest 312.

The techniques discussed herein seek to register region of interest 312 with a target region within target portion 313 by providing homography parameters that map between region of interest 312 and the target region and/or map both region of interest 312 and the target region to a shared coordinate system.

Returning to FIG. 1, ROI 112 and target portion 113 are provided to semantic conversion module 103, which converts ROI 112 to a foreground likelihood (FL) ROI 114 and target portion 113 to a FL target portion 115. As discussed, determining homography parameters in ONPI in the color domain may be unworkable. To avoid estimating and modeling color correction, ROI 112 (e.g., each source patch) and target portion 113 (e.g., each target destination patch) is converted to a space where no color correction is needed. In some embodiments, as illustrated, ROI 112 is converted to FL ROI 114 and target portion 113 is converted to FL target portion 115. As used herein, the term foreground likelihood indicates a likelihood each pixel is a foreground pixel. For example, in the context of a binary foreground likelihood image patch, pixel may be one when the pixel measure of foreground is above a threshold and a pixel may be zero when the pixel measure of foreground is below threshold. In non-binary foreground likelihood image patches, the pixel value may range in values with higher values indicating higher likelihood the pixel is a part of the foreground.

Figure 4:
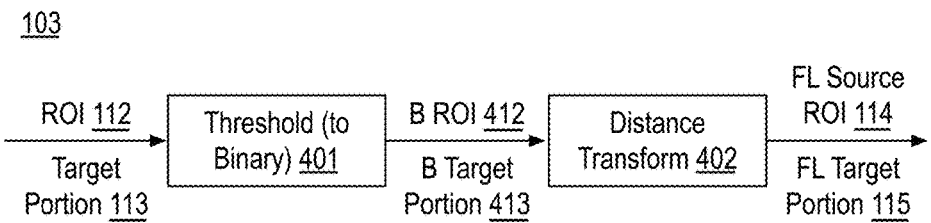
FIG. 4 illustrates an example semantic conversion module for implementation in the apparatus of FIG. 1.

FIG. 4 illustrates an example semantic conversion module 103 for implementation in apparatus 100, arranged in accordance with at least some implementations of the present disclosure. As shown in FIG. 4, semantic conversion module 103 includes a threshold module 401 and a distance transform module 402. Threshold module 401 converts ROI 112 and target portion 113 to binary (B) ROI 412 and binary target portion 413 such that each of binary ROI 412 and binary target portion 413 are binary images having a first value (e.g., one, 255, or the like) for pixels determined to be in a foreground and a second value (e.g., zero) for pixels determined to be in a background. Threshold module 401 may convert ROI 112 and target portion 113 to binary ROI 412 and binary target portion 413 using any suitable technique or techniques. In some embodiments, threshold module 401 performs the conversion using automatic thresholding techniques. In some embodiments, threshold module 401 generates an intensity threshold to separate pixels of the image patch into foreground and background classes and then implements the threshold on a pixel-wise basis. In some embodiments, threshold module 401 implements Otsu's method, although any segmentation techniques may be used.

Figure 5:
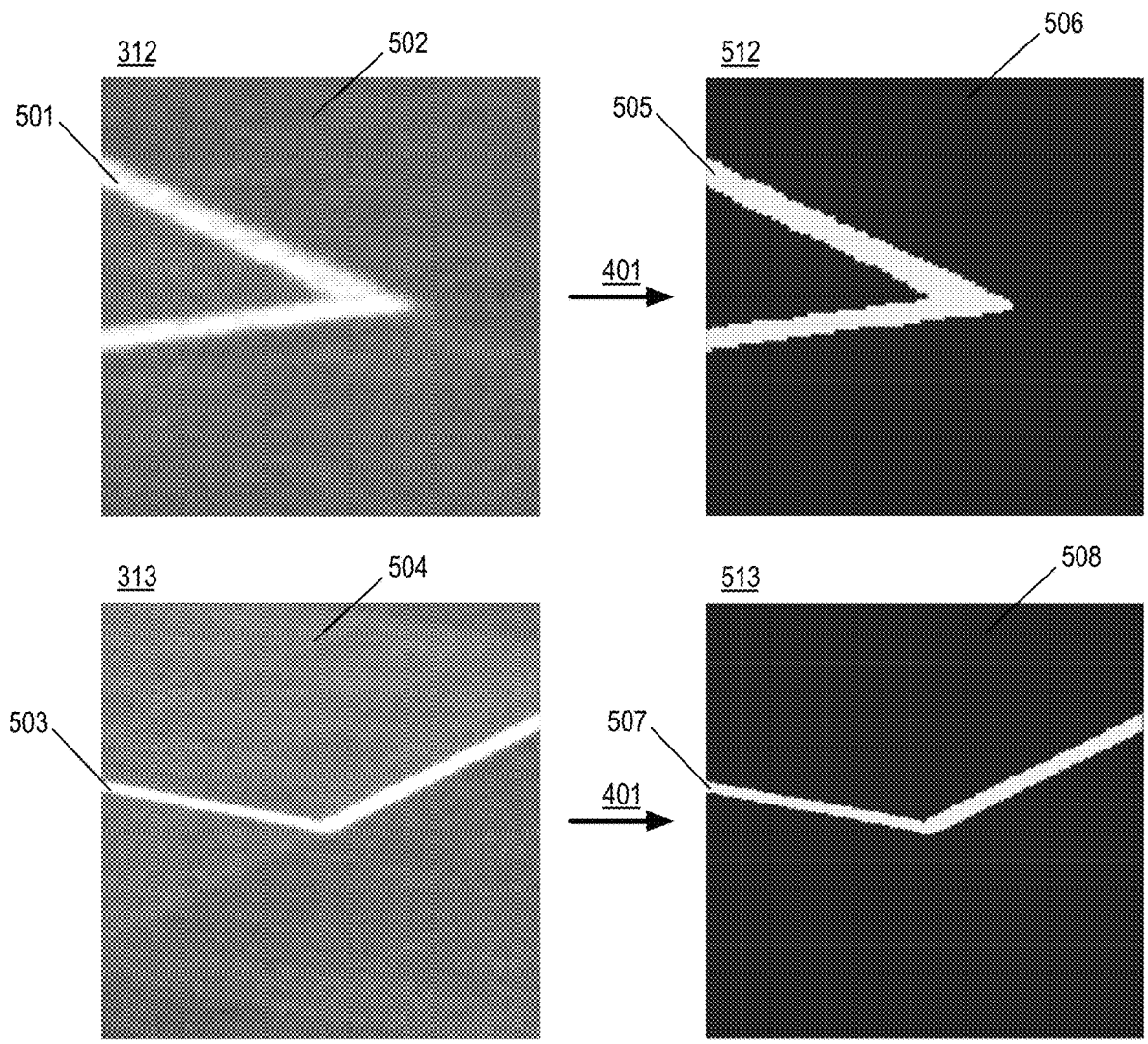
FIG. 5 illustrates an example binary region of interest and an example binary target image portion.

FIG. 5 illustrates an example binary region of interest 512 and an example binary target image portion 513, arranged in accordance with at least some implementations of the present disclosure. For example, region of interest 512 and example binary target image portion 513 correspond to region of interest 312 and target portion 313, respectively. As shown, threshold module 401 converts region of interest 312 to binary region of interest 512. Notably, region of interest 312 includes foreground pixels 501 (e.g., inclusive of a field marking of a sporting field) and background pixels 512 (e.g., inclusive of the sporting field). Threshold module 401 detects and separates foreground pixels 501 and background pixels 502 using the techniques discussed with respect to FIG. 4 to generate binary region of interest 512 having foreground pixels 505 having a first value and background pixels 506 having a second value. Similarly, threshold module 401 converts target portion 313, including foreground pixels 503 and background pixels 504, to binary target image portion 513 having foreground pixels 507 having the first value and background pixels 508 having the second value. Notably, such conversion from the color image space ensures that color change between source and target images is irrelevant and geometric shapes are matched instead of their color. Furthermore, pixels that drive the iterative process to homography parameter convergence (as discussed further bellow) are erroneous pixels not conforming to the geometry of the foreground.

Returning to FIG. 4, distance transform module 402 receives binary ROI 412 and binary target portion 413 and distance transform module 402 applies a distance transform to each to generate FL ROI 114 and FL target portion 115. For example, distance transform module 402 may apply a distance transform such that foreground pixels (e.g., values of 255) keep the same value, and background pixels (e.g., values of zero) are adjusted toward white based on the distance of the pixel from any foreground pixel such that the adjustment is inversely proportional to the distance from any foreground pixel. In some embodiments, the distance of each pixel (e.g., using the distance transform values) from a white value (e.g., 255 in 8 bit grayscale) is subtracted from the white value and assigned to the pixel. Notably, the result of distance transform module 402 leaves foreground pixels and provides a texture emanating from the foreground pixels.

Figure 6:
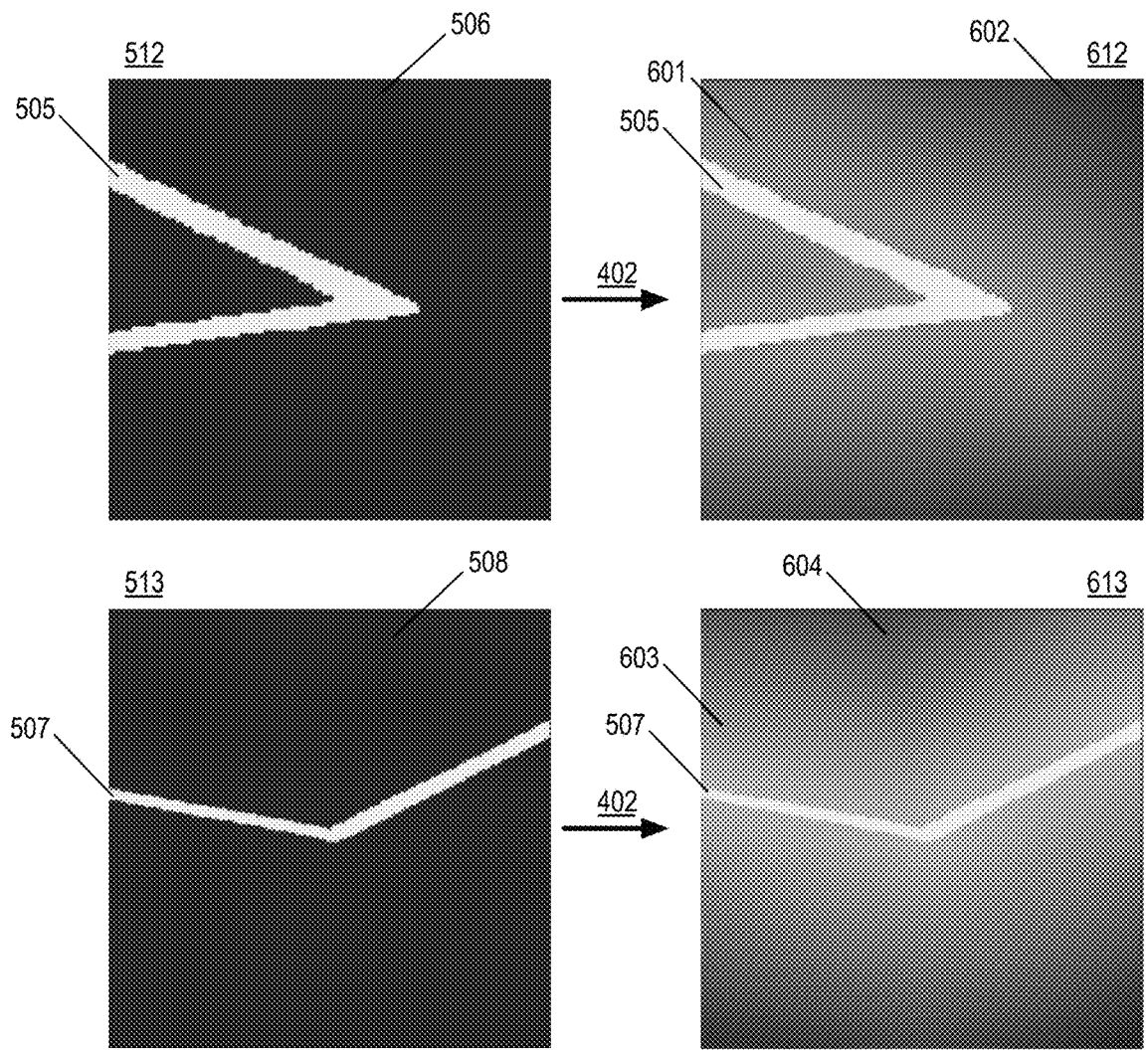
FIG. 6 illustrates an example foreground likelihood region of interest and an example foreground likelihood image portion.

FIG. 6 illustrates an example foreground likelihood region of interest 612 and an example foreground likelihood target image portion 613, arranged in accordance with at least some implementations of the present disclosure. For example, foreground likelihood region of interest 612 and an example foreground likelihood target image portion 613 correspond to binary region of interest 512 and binary target image portion 513, respectively. As shown, distance transform module 402 converts binary region of interest 512 to foreground likelihood region of interest 612 such that foreground pixels 505 remain (e.g., maintain a full foreground likelihood value such as 255) and background pixels 506 have values that drop off moving away from foreground pixels 505 such that a foreground likelihood gradient 601 is provided that has decreasing foreground likelihood values moving from foreground pixels 505 (e.g., value of 255) to background pixels 602 (e.g., value of 0). Similarly, distance transform module 402 converts binary target image portion 513 to foreground likelihood target image portion 613 such that foreground pixels 507 remain (e.g., maintain a value of 255) and background pixels 508 are converted to foreground likelihood values having foreground likelihood gradient 603 with higher values close to foreground pixels 507 and lower values moving away from foreground pixels 507 and to background pixels 604. Notably, application of distance transform module 402 the issue of when an initial image portion estimation is too far from the correct perspective, when the textures have no or few pixels overlapping and/or when there is no interaction between the ROI foreground and the target portion foreground. In such contexts, use of a binary foreground mask may get stuck in a plateau where no improvement is seen across iterations. To rectify such issues, distance transform module 402 advantageously expands the texture of the foreground object.

Returning to FIG. 1, semantic conversion module 103 outputs FL ROI 114 and FL target portion 115 for use by homography registration module 104. As discussed, FL ROI 114 represents a semantic version of a detected region of interest in a source image and FL target portion 115 is a semantic version of a detected portion in a target image such that the region of interest and the portion are expected to both have imagery of a shared object of interest. Semantic conversion module 103 generates homography parameters 116 that map between FL ROI 114 and FL target portion 115 to geometrically map FL ROI 114 to a target region within FL target portion 115. Such homography parameters 116 are generated using iterative processing as discussed below and seek to minimize a cost function based on differences between FL ROI 114 as mapped based on homography parameters 116 and the actual target region of FL target portion 115.

Figure 7:
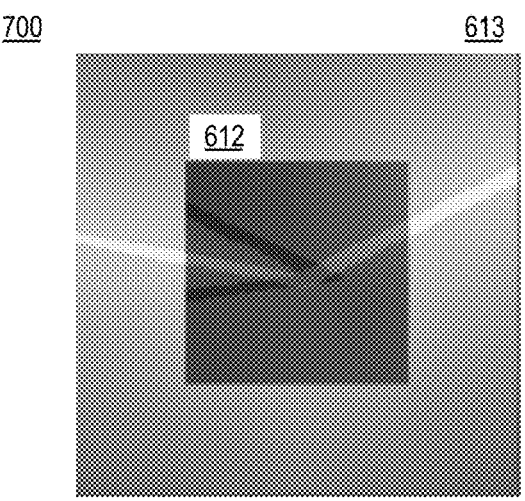
FIG. 7 illustrates an example initial overlap of a foreground likelihood region of interest onto a foreground likelihood image portion.

FIG. 7 illustrates an example initial overlap 700 of foreground likelihood region of interest 612 onto foreground likelihood target image portion 613, arranged in accordance with at least some implementations of the present disclosure. As shown, when foreground likelihood region of interest 612 is not modified by homography parameters 116 (e.g., no translation, rotation, or perspective change) is implemented, overlap 700 is provided. During iterations of homography parameters convergence, foreground likelihood region of interest 612 is mapped based on the current homography parameters to alter foreground likelihood region of interest 612 into a translated, rotated, warped, etc. version thereof (which may be characterized as a candidate region of interest) to better align with a target region of foreground likelihood target image portion 613 (not shown). For example, the mapped version of foreground likelihood region of interest 612 is not expected to fill the entirety of foreground likelihood target image portion 613 but instead seeks to match a patch or region (e.g., a target region) of foreground likelihood target image portion 613.

Furthermore, each iteration of the mapping parameters convergence analyzes a cost function based on the match or mismatch between the mapped version of foreground likelihood region of interest 612 and foreground likelihood target image portion 613. Such cost or error is generally based on the pixel-wise difference therebetween. At each iteration, changes in the homography parameters (e.g., a delta with respect to prior homography parameters) is generated based on modeling the error using a first order approximation and attempting to minimize the error as well as implementation of regularization parameters that limit changes in the homography parameters. Such regularization may be used to allow variation in only some homography parameters (e.g., translation parameters) while blocking other homography parameters (e.g., rotation and perspective parameters) at initial iterations while allowing full variation at later iterations. Such regularization may implement a trust region parameter to further vary the change in mapping parameters. As used herein, the term trust region parameter indicates a parameter to vary regularization of a change in homography parameters such that a large trust region parameter provides reduced regularization (and more flexibility in changing the homography parameters). As used herein, the term blocking indicates deterring variation in a parameter. Such blocking to limit changes in early iterations while opening all parameters to variation in later iterations may improve convergence for improved convergence. Furthermore, after an iteration determines the change in homography parameters using the first order approximation, a ratio of the estimated error change using the true error model (e.g., the model the first order approximation is based on) and the estimated error change using the first order approximation is generated. The ratio (and whether the true error model indicates improvement in overall cost or not) is then used to alter the trust region parameter at the current iteration and implement repeated change in the mapping parameters estimation or to indicate use of the change at a next iteration. As used herein, the term true error model indicates an error model used by the process as true and, in some embodiments, the true error model may be characterized as a higher order model relative to the first order approximation thereof. Such techniques are discussed further herein below.

Such resultant homography parameters 116 are provided from apparatus 100 as output and may be used in a variety of contexts such as calibration of camera array 101, and other uses. In addition, resultant homography parameters 116 may be provided to 3D structure curvature approximation module 105, which may estimate normal vectors 117 for a 3D structure (e.g., surface) in scene 110. Such normal vectors 117 may be generated using any suitable technique or techniques. In some embodiments, normal vectors 117 are approximated for a 3D structure in scene 100 corresponding to source and target images based on resultant homography parameters 116 and locations and orientations of first and second cameras used to attain the source and target images, respectively.

Figure 8:
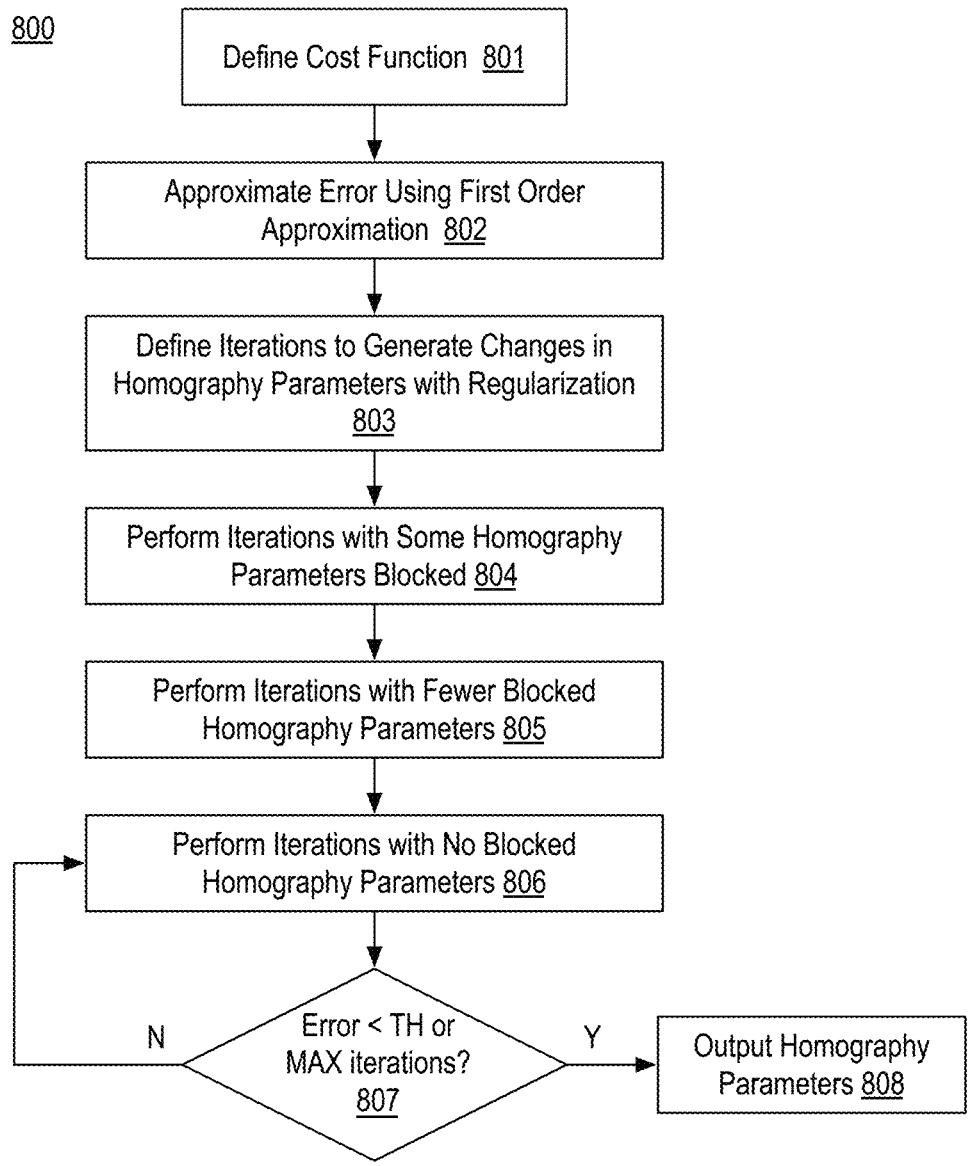
FIG. 8 illustrates an example process for generating homography parameters based on an input foreground likelihood source region of interest and an input foreground likelihood target image portion using iterative convergence processing.

FIG. 8 illustrates an example process 800 for generating homography parameters based on an input foreground likelihood source region of interest and an input foreground likelihood target image portion using iterative convergence processing, arranged in accordance with at least some implementations of the present disclosure. Process 800 may include one or more operations 801-808 as illustrated in FIG. 8. For example, operations 801-808 may be performed by homography registration module 104 to generate homography parameters 116 based on FL ROI 114 and FL target portion 115.

Process 800 begins at operation 801, where a cost function is defined such that the cost function is minimized when optimal (or at least an approximation of optimal) homography parameters for mapping of the foreground likelihood ROI to the foreground likelihood target portion or patch are determined. For example, Equation (3) above introduced a cost function based on a color ROI and a color target portion. However, as discussed, optimization of such a cost function may be unworkable and conversion to a semantic space such as foreground likelihood is advantageous.

In some embodiments, a cost function may be defined as shown in Equation (4):

$$\hat{p} = \operatorname*{argmin}_{p} \sum_{x \in patch} \frac{1}{2} \| \tilde{I}_s(x) - \tilde{I}_t(\phi(x; p)) \|^2 \qquad (4)$$

where $\tilde{I}_s$ and $\tilde{I}_t$ are the foreground likelihood ROI and a candidate target region in the foreground likelihood portion as mapped from the foreground likelihood ROI, respectively, and $\hat{p}$ is the resultant homography parameters (discussed further below) that minimizes the total cost across the pixels of the patches (e.g., regions). Notably, the color correction term is dropped with respect to Equation (3) and only geometric parameters are minimized. Furthermore, it is noted that Equation (4) presents a non-linear least squares problem having no globally provable optimum solution.

Furthermore, an error (or residual) term for a single pixel may be defined and the cost function may be revised as shown in Equations (5):

$$e_x(p) = \tilde{I}_s(x) - \tilde{I}_t(\phi(x; p)) \qquad (5)$$

$$\hat{p} = \operatorname*{argmin}_{p} \sum_{x \in patch} \frac{1}{2} \| e_x(p) \|^2$$

where $e_x(p)$ is the per pixel error. The per pixel errors are squared and summed, and the sum is halved to generate an overall error or residual for the current mapping of the foreground likelihood ROI to the target portion, which is minimized to determine the optimal resultant homography parameters.

Processing continues at operation 802, where a first order approximation of the error is defined. For example, given the initial estimation of p (e.g., the first mapping to a candidate region) is close to the true target value (e.g., p=p̂+Δp), the error term may be approximated using a first order approximation (e.g., according to the Newton-Raphson method) as shown in Equations (6):

$$y \approx \phi(x;\tilde{p}) + \partial_p \phi \Delta p$$

$$e_x(p) \approx e_x(\tilde{p}) + \nabla_p e_x(p) \Delta p \qquad (6)$$

where Δp is a change in homography parameters and p̃ are the initial homography parameters.

For full perspective mapping (e.g., full homography) the previously discussed mapping function, ϕ, may be defined as shown in Equations (7):

$$\phi(x; p) = \begin{pmatrix} p_1 & p_2 & p_3 \\ p_4 & p_5 & p_6 \\ p_7 & p_8 & 1 \end{pmatrix} x_h \qquad (7)$$

$$x_h = (x, 1)^T$$

where parameters $p_1$, $p_2$, $p_4$, $p_5$ are rotation parameters, parameters $p_3$, $p_6$, are translation parameters, parameters $p_7$, $p_8$, are translation parameters, and x, as discussed above is the source ROI center.

The Jacobian of the error, $e_x(p)$, may then be determined as shown in Equation (8):

$$J_x = \nabla_p e_x(p) = \nabla_p (\tilde{I}_s(x) - \tilde{I}_t(\phi(x; p))) = -\nabla_p \tilde{I}_t(\phi(x; p)) = \quad (8)$$

$$-\frac{\partial \tilde{I}_t^T}{\partial y} \frac{\partial \phi}{\partial p} = -(\partial_u \tilde{I}_t \quad \partial_v \tilde{I}_t) \begin{pmatrix} u & v & 1 & 0 & 0 & 0 & -u'u & -u'v \\ 0 & 0 & 0 & u & v & 1 & -v'u & -v'v \end{pmatrix}$$

where u and v are representations in the homography space as is known in the art.

The Jacobian of the error provides a first order approximation of the error and may be used to define an iterative process to converge to (at least) a local minimum as shown in Equation (9):

$$\operatorname*{argmin}_p \sum_{x \in patch} \frac{1}{2} \|e_x(p)\|^2 \approx \operatorname*{argmin}_p \sum_{x \in patch} \frac{1}{2} \|e_x(\tilde{p}) + \nabla_p e_x(p)\Delta p\|^2 = \quad (9)$$

$$\operatorname*{argmin}_p \sum_{x \in patch} \frac{1}{2} \|e_x(\tilde{p}) + J_x \Delta p\|^2$$

$$\nabla_{\Delta p} = 0: \sum_{x \in patch} J_x^T e_x(\tilde{p}) + J_x^T J_x \Delta p = 0$$

Defining g and H, as shown in Equations (10), an iterative update process is provided for the homography parameters, p, as shown in Equations (11):

$$g = \Sigma_{x \in patch} J_x^T e_x(\tilde{p})$$

$$H = \Sigma_{x \in patch} J_x^T J_x \quad (10)$$

$$\Delta p = -H^{-1} g$$

$$p_{k+1} = p_k + \Delta p \quad (11)$$

where $\Delta p$ is a change in homography parameters at a current iteration, k, to adjust the homography parameters at the current iteration, $p_k$, to homography parameters at the next iteration, $p_{k+1}$. Such techniques provide a direction and step size for adjusting the homography parameters at each iteration.

However, since the first order approximation of the error, $e_x(p)$, may be of insufficient accuracy the change in homography parameters, $\Delta p$, may minimize the first order approximation but not the true (e.g., higher order) cost function. As used herein the term first order approximation or first order indicates an approximation using linear approximations (e.g., linear variables) but not second order approximations (e.g., squared variables) or higher order approximations. The term higher order approximation with respect to a first order approximation indicates an approximation using at least second order approximations (e.g., squared variables) and possibly higher. Notably, the change in homography parameters, $\Delta p$, may not minimize or reduce the error in the true cost function (e.g., higher order cost function) as defined in Equations (5).

Processing continues at operation 803, where iterations are defined using regularization to overcome the possibility that the change in homography parameters, $\Delta p$, minimize the first order approximation but not the true cost function. In some embodiments, regularization is provided in the iteration to offer counterweight to the cost function such that parameter changes are blocked or deterred in the generation of the homography parameters, $\Delta p$. That is, the cost function may be modified to apply the regularization parameters in the generation of the change in homography parameters. In some embodiments, regularization with a trust region is applied to adjust the homography parameters, $\Delta p$, at each iteration. In some embodiments, regularization with a trust region is employed as shown in Equation (12):

$$\operatorname*{argmin}_p \sum_{x \in patch} \frac{1}{2} \|e_x(\tilde{p}) + \nabla_p e_x(p)\Delta p\|^2 + \frac{1}{\mu} \|D\Delta p\|^2 \quad (12)$$

where $\mathcal{D}$ is a diagonal matrix having regularization parameters along the diagonal thereof and $\mu$ is a trust region parameter.

Notably, the diagonal matrix of regularization parameters may have zeroes at every location in the matrix except along the diagonal. Furthermore, the diagonal matrix of regularization parameters may be an 8×8 matrix with each regularization parameter value along the diagonal (e.g., $R_1$, $R_2$, ... $R_7$, $R_8$) corresponding to one of the homography parameters (e.g., $p_1$, $p_2$, ... $p_7$, $p_8$) such that each regularization parameter may allow variation in the corresponding homography parameter (e.g., by using a small or zero regularization parameter) or block variation in the corresponding homography parameter (e.g., by using a large regularization parameter). That is, when a regularization parameter is large, a change in the corresponding homography parameter provides a large error component and, conversely, when a regularization parameter is small, a change in the corresponding homography parameter provides a small error component due to the right side of Equation (12). By implementing differing regularization parameters, some homography may be blocked and others may be allowed to vary more freely as discussed further below.

Furthermore, the trust region parameter, $\mu$, provides for overall regularization (or regulation) of the change in the homography parameters. Notably, when the trust region parameter is small, the regularization term $$\left( e.g., \frac{1}{\mu} \|\mathcal{D}\Delta p\|^2 \right)$$

penalizes large changes in the homography parameters in the overall cost function and the minimization tends toward smaller changes in the homography parameters. Conversely, when the trust region parameter is small, the regularization term does not larger changes in the changes in the homography parameters. Therefore, the trust region parameter may be considered a confidence parameter such that, when confidence in the change in homography parameters is high, a larger trust region parameter is employed to move quickly in the direction of the change in homography parameters while, when confidence in the change in homography parameters is low, a smaller trust region parameter is employed to move slowly in the direction of the change. Adjustments may be made to the trust region parameter at various iterations as is discussed further herein.

Notably, the regularizing matrix, $\mathcal{D}$, may impose a different regularizing factor (regularization parameter) to each homography parameter, which is desirable in perspective transformation as there is an inherent imbalance of scale between parameters (e.g., rotation parameters, translation parameters, and perspective parameters) as well as advantages in allowing or blocking variation in such parameters across iterations for improved convergence. It is noted that while choosing the diagonal of the regularizing matrix to be the square-root of the approximated Hessian (e.g., $\sqrt{J^TJ}$) may mitigate such issues, there is additional undesired codependence between the homography parameters such that different parameters can affect the cost function in a similar manner making it unclear which parameter should be dominant in a certain optimization step, which can create unwanted saddle points in the parameter space. To address techniques to block (or over-regularize) groups of parameters in different stages of the convergence iterations may be used by varying (e.g., increasing or multiplying) values of the regularization parameters in the diagonal of regularizing matrix, $\mathcal{D}$. For example, rotation and perspective parameters may first be blocked while parameter optimization is performed only for translation parameters. Subsequently, when the patches or regions are sufficiently overlapping, the block on rotation parameters can be released. Then, subsequent to the release of the block of the rotation parameters, the block on the perspective parameters is released.

Using the techniques discussed with respect to Equations (6) through (11), an iterative process to generate changes in homography parameters inclusive of regularization using regulation parameters and a trust region parameter may be defined as shown in Equations (13):

$$\Delta p = -\left(H + \frac{1}{\mu}\mathcal{D}^2\right)^{-1} g \qquad (13)$$
$$p_{k+1} = p_k + \Delta p$$

It is noted that as $$\mu \to \infty: \frac{1}{\mu}\|\mathcal{D}\Delta p\|^2 \to 0 \text{ and as } \mu \to 0: \frac{1}{\mu}\|\mathcal{D}\Delta p\|^2 \to \infty$$

such that the trust region parameter, as discussed above, may dampen changes in homography parameters (e.g., $\Delta p$) when a small trust region parameter is implemented or promote changes in the homography parameters when a large trust region parameter. That is, as the trust region parameter is increased, a trust region is expanded (e.g., a trust region for trust in change in the homography parameter space) such that a larger step size in the desired direction is employed. When the trust region parameter is reduced, the trust region shrinks and a stronger regularizing term is enforced which causes smaller step sizes in the desired direction. In a similar manner, per homography parameter regularization parameters may allow or block changes in particular homography parameters at a processing iteration.

For example, a change in homography parameters, $\Delta p$, is generated using the first Equation of Equations (13). For example, a sum over pixel-wise transposes of Jacobian of an error term by a Jacobian of the error term (e.g., H), an inverse Jacobian by the error term (e.g., g) and a regularization term $$\left(\text{e.g., } \frac{1}{\mu}\mathcal{D}^2\right)$$

are generated. An opposite of an inverse of the sum of the sum over pixel-wise transposes of Jacobian of the error term by the Jacobians of the error term and the regularization term by the inverse Jacobian by the error term is then provided as a first order approximation of the change in homography parameters, $\Delta p$.

Processing continues at operation 804, where iterations are performed with at least some of the homography parameters blocked via application of large corresponding regularization parameters. In some embodiments, the iterations performed at operation 804 allow variation in the translation homography parameters while blocking variation in both rotation and perspective parameters. In some embodiments, the regularization parameters corresponding to the rotation and perspective homography parameters are larger than the regularization parameters corresponding the translation homography parameters in such iterations. In some embodiments, the regularization parameters corresponding to the rotation and perspective homography parameters are multiples of the regularization parameters corresponding the translation homography parameters such as order of magnitude larger, two orders of magnitude larger, or the like. For example, by blocking rotation and perspective changes, translation may first be optimized to overlap foreground regions of the region of interest and the target region in the target image portion. It is noted that processing may continue from operation 804 to operation 805 after a particular number of iterations have been performed or after a particular error threshold has been met, as discussed with respect to decision operation 807.

Processing continues at operation 805, where iterations are performed with at least some of the homography parameters blocked at operation 804 being released. In some embodiments, the iterations performed at operation 805 allow variation in the translation and rotation homography parameters while blocking variation in perspective parameters. As with operation 804, in some embodiments, the regularization parameters corresponding to perspective homography parameters are larger than the regularization parameters corresponding the translation and rotation homography parameters in such iterations. In some embodiments, the regularization parameters corresponding to the perspective homography parameters are multiples of the remaining regularization parameters such as order of magnitude larger, two orders of magnitude larger, or the like. In some embodiments, the regularization parameters corresponding to rotation homography parameters are reduced from operation 804 to operation 805 while the regularization parameters corresponding to perspective homography parameters remain unchanged. For example, by blocking perspective changes, translation and rotation may be optimized to more fully overlap foreground regions of the region of interest and the target region in the target image portion prior to optimizing perspective mapping. As with the transition from operation 804 to operation 805, processing may continue from operation 805 to operation 806 after a particular number of iterations have been performed or after a particular error threshold has been met.

Processing continues at operation 806, where iterations are performed with all homography parameters being released and allowed to vary for optimal mapping. For example, the regularization parameters corresponding to perspective homography parameters may be reduced from operation 805 to operation 806. Notably, each iteration at operations 804, 805, 806 may proceed as follows. First, the regularizing matrix regularization parameters and the trust region parameter are defined. Notably, the regularization parameters may be set according to the iterations to allow variation or block variation in particular corresponding homography parameters as discussed above. Furthermore, the trust region parameter may be adjusted as discussed further herein below with respect to FIG. 9. Based on the current homography parameters, the regularization parameters, and the trust region parameter, a change in the homography parameters is generated as discussed with respect to Equation (13). In some embodiments, changes in model errors based on the change in homography parameters is tested and used to alter the trust region parameter and/or generate a new change in homography parameters at the current iteration as discussed with respect to FIG. 9. In other embodiments, such processing is not employed and the change in homography parameters are implemented at the following iteration. Such processing (determine changes in homography parameters and apply at the subsequent iteration) is then repeated until an iteration budget is used (MAX iterations met) or a convergence test is met (Error<TH).

Processing continues at decision operation 807, where a determination is made as to whether iterative processing is to continue. Such a determination may be made based on a number iterations (e.g., an iteration budget may be used and once all iterations have been performed, processing ceases) or based on an error threshold being met. For example, at each iteration, an overall error may be determined as discussed with respect to Equation (4) and if the overall error is less than a predetermined threshold, iterative processing ceases. Such techniques may also be applied after operation 804 and operation 805 to prove release of more homography parameters as discussed above.

Figure 9:
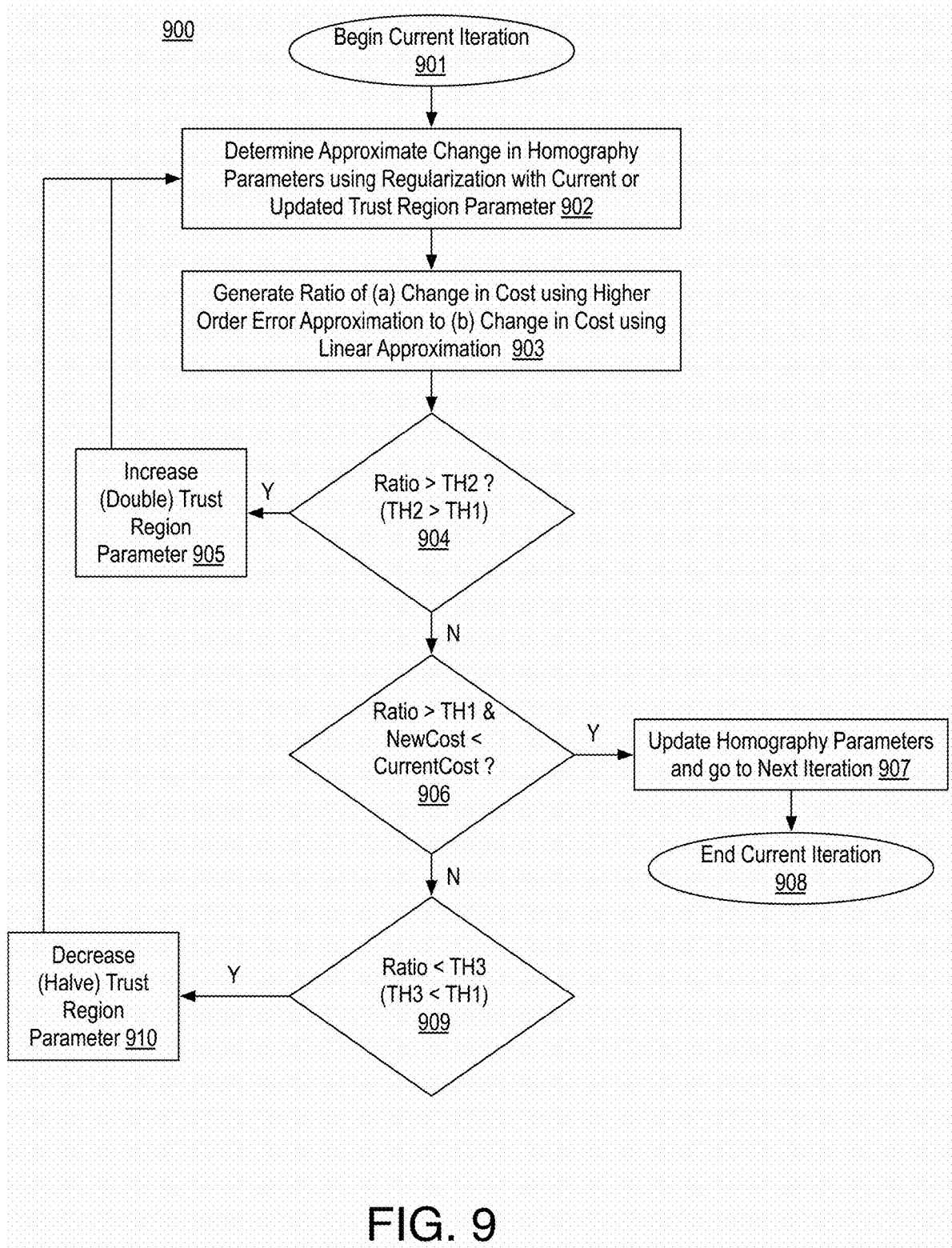
FIG. 9 illustrates an example process for generating a change in homography parameters and trust region parameter adjustment at a current iteration of homography parameters convergence processing.

FIG. 9 illustrates an example process 900 for generating a change in homography parameters and trust region parameter adjustment at a current iteration of homography parameters convergence processing, arranged in accordance with at least some implementations of the present disclosure. Process 900 may include one or more operations 901-910 as illustrated in FIG. 9. For example, operations 901-910 may be performed by homography registration module 104 at one or more iterations (e.g., at any iteration of operations 804, 805, 806) to generate a change in homography parameters for the current iteration and, optionally a change in trust region parameter adjustment for the current and subsequent iterations. The term current iteration is meant to indicate a particular iteration with the current iteration being preceded by any number of prior iterations and followed by any number of subsequent iterations.

Process 900 begins at operation 901, where processing begins for a current iteration of homography parameters convergence. Notably, at operation 901, a set of homography parameters, a set of regularization parameters, a trust region parameter, and an overall cost of the set of homography parameters may be received or retrieved with such parameters being generated at a prior iteration (or initialized for an overall first iteration).

Processing continues at operation 902, where an approximate change in homography parameters are determined using regularization parameters as discussed with respect to FIG. 8 and the trust region parameter from a previous iteration. The approximate change in homography parameters attempt to converge the homography parameters toward a minimization of a cost or error function as discussed herein. For example, the change in homography parameters may be generated as discussed with respect to Equation (13). The change in homography parameters provides a first order approximation to iteratively move toward resultant homography parameters.

Processing continues at operation 903, where a ratio of (a) a change in cost (or error) generated using the true error approximation (e.g., higher order approximation) to (b) a change in cost (or error) generated using the first order approximation is generated. As discussed, the change in homography parameters generated the first order approximation with regularization may optimize the first order approximation of the error or cost function but not the true cost function or error. The ratio is indicative of the movement in the true cost relative to the movement in the error in the first order approximation. Such a ratio may then be used to alter the trust region parameter as discussed below.

In some embodiments, the ratio generated at operation 903 is generated as shown with respect to Equation (14):

$$\rho = \frac{\|e(p)\|^2 - \|e(p+\Delta p)\|^2}{\|e(p)\|^2 - \|e(\tilde{p}) + J\Delta p\|^2} \quad (14)$$

where $\rho$ is the ratio, $\|e(p)\|^2 - \|e(p+\Delta p)\|^2$ is the true cost improvement or change in the error (e.g., the error from a prior iteration less the error with the change in homography parameters implemented, the error based on the true cost model), and $\|e(p)\|^2 - \|e(\tilde{p}) + J\Delta p\|^2$ is a first order approximation of a change in error using the change in the homography parameters (e.g., the error from a prior iteration less an approximation of the error with the change in homography parameters generated using a first order model).

Furthermore, at the current iteration, an overall cost of the homography parameters with implementation of the change in homography parameters generated at operation 902 is generated. The overall cost may be generated using Equation (4) for example (based on $p_{k+1} = p_k + \Delta_p$), and may be labeled as New Cost. As discussed, the overall cost using the prior homography parameters, $P_k$, was received at operation 901 and may be labeled as CurrentCost.

Processing continues at decision operation 904, where a determination is made as to whether the ratio generated at operation 903 exceeds a threshold, TH2. Notably, a threshold TH1, characterized as ε below (implemented at decision operation 906), may be less than threshold TH2, characterized as $\eta_1$ below (implemented at decision operation 904), and greater than a threshold TH3, characterized as $\eta_2$ below (implemented at decision operation 909). For example, at decision operation 904, a determination may be made that the change in homography parameters generated using a first order approximation improves the true error approximation at a greater rate than it improves the first order error approximation. As shown, in such contexts, processing continues at operation 905, where the trust region parameter is increased. The trust region parameter may be increased by any amount such as doubling, as illustrated. Processing then continues at operation 902 as discussed where a new change in homography parameters at the current iteration is generated again using the first order approximation described with respect to Equation (13). Notably, by increasing the trust region parameter the model is expected to increase the movement of the change in homography parameters, which is desirable as the model is improving the true error reduction even more than expected. Such processing may continue any number of times via decision operation 904 to increase the trust region parameter (and continue to decrease the error from the change in homography parameters) until the ratio drops below TH2. TH2 may be any suitable value greater than one such as 1.5.

If the ratio generated at operation 903 does not exceed threshold TH2, processing continues at decision operation 906, where a determination is made as to whether the ratio generated at operation 903 exceeds threshold, TH1 and the cost using the change in homography parameters (NewCost) is less than the cost using the prior homography parameters (CurrentCost). Notably, threshold TH1 is less than TH2 and TH1 may be any value. In some embodiments, threshold TH1 may be greater than one but it need not be. For example, decision operation 906 evaluates whether the change in homography parameters provides improvement as evaluated by cost reduction over the prior homography parameters (e.g., NewCost<CurrentCost?) and whether the ratio indicates cost improvement but not rapid cost improvement as when the ratio exceeds TH2. In such contexts, processing continues at operation 907, where the change in homography parameters is implemented to update the homography parameters for a subsequent iteration (e.g., $p_{k+1}=p_{k+\Delta p}$) and no change is made to the trust region parameter, and at end operation 908 where the current iteration ends (and processing may begin at operation 901 for a subsequent iteration). Furthermore, processing ends at operation 906 for the current iteration, where a next iteration may be implemented. It is noted that decision operation 906 may be implemented after increase or decrease of the trust region parameter at the current iteration.

If either the change in homography parameters provides increase in the cost function (e.g., deterioration in performance) or no improvement or the ratio does not exceed threshold TH1, processing continues at decision operation 909, where a determination is made as to whether the ratio is less than threshold TH3, or directly to operation 910. For example, threshold TH3 may be implemented to reduce step size only when the ratio has indicated the true cost function has become non-responsive to the first order approximation being implemented. If so, processing continues at operation 910, where the trust region parameter is decreased. The trust region parameter may be decreased by any amount such as halving. Processing then continues at operation 902 as discussed where a new change in homography parameters at the current iteration is generated. Notably, by decreasing the trust region parameter the model is expected to decrease the movement of the change in homography parameters in hopes of finding a smaller step that reduces the error with a smaller step size. TH3 may be any suitable value less than one such as 0.5. In instances where the ratio is not less than TH3 but is ness than TH1, the trust region parameter may be reduced by a smaller amount such as reduction by one-quarter and processing may continue at operation 902.

For example, process 900 may implement a selection of trust region parameter, μ, in accordance with the following Pseudocode (1):

Pseudocode (1):

1. For a given μ solve $$\Delta p = -\left(H + \frac{1}{\mu}\mathcal{D}^2\right)^{-1} g$$

2. Generate ρ for this candidate Δp
3. If ρ>ε and NewCost<CurrentCost then break and update $p_{k+1}=p_k+\Delta p$
4. If ρ>$\eta_1$ then μ=2μ and GOTO 1
5. If ρ>$\eta_1$ or CurrentCost<NewCost then $$\mu = \frac{\mu}{2} \text{ and } GOTO\ 1$$

(Note: performed for each iteration, k, on homography parameters, p.)
(Note: $\eta_1$>ε>$\eta_2$)

Figure 10:
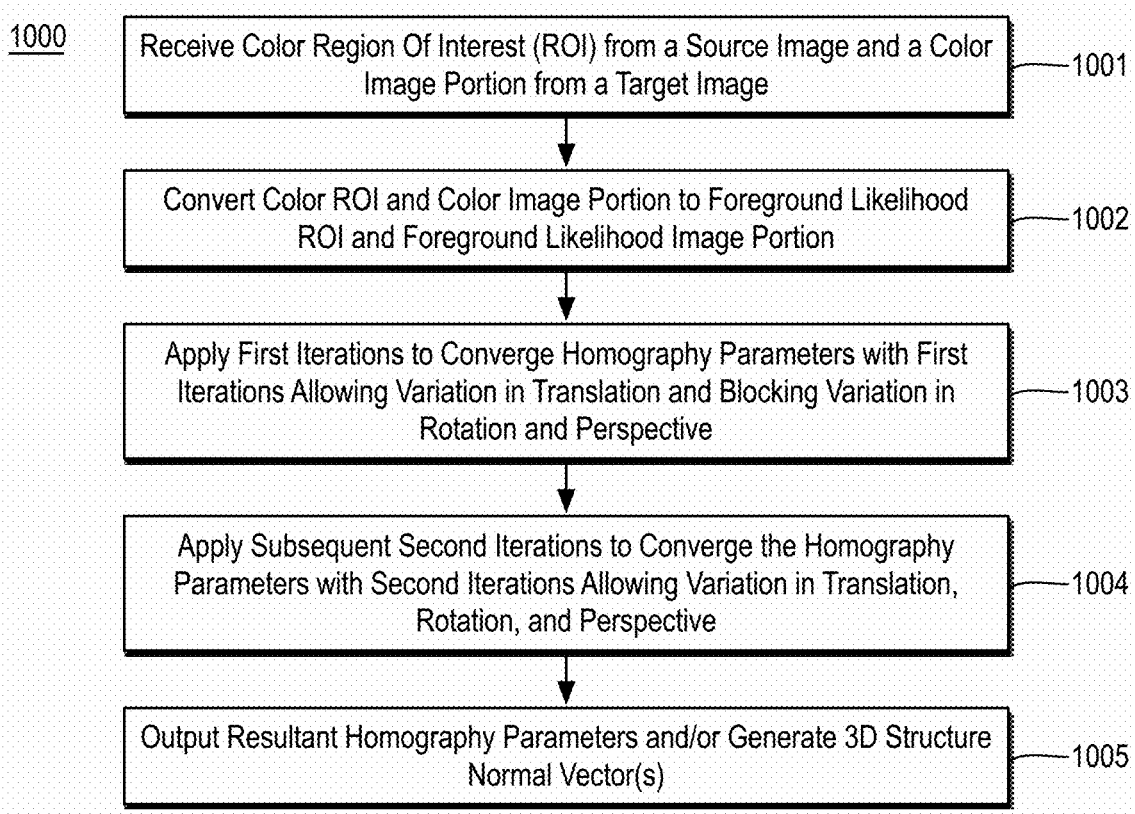
FIG. 10 is a flow diagram illustrating an example process for performing image registration.

FIG. 10 is a flow diagram illustrating an example process 1000 for performing image registration, arranged in accordance with at least some implementations of the present disclosure. Process 1000 may include one or more operations 1001-1005 as illustrated in FIG. 10. Process 1000 may form at least part of an image registration process for immersive video, for example. By way of non-limiting example, process 1000 may form at least part of a process as performed by apparatus 100 as discussed herein. Furthermore, process 1000 will be described herein with reference to system 1100 of FIG. 11.

Figure 11:
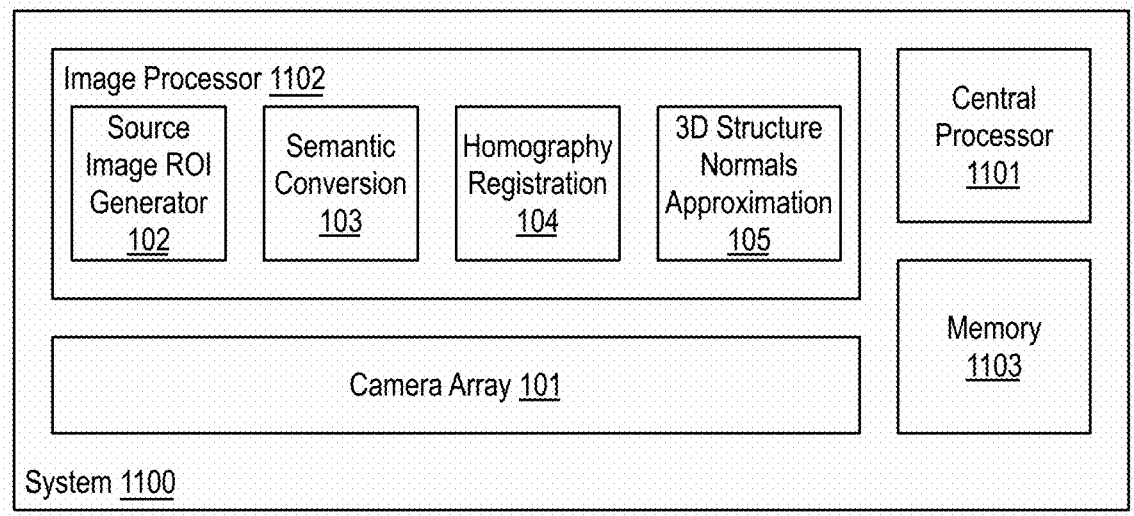
FIG. 11 is an illustrative diagram of an example system for performing image registration.

FIG. 11 is an illustrative diagram of an example system 1100 for performing image registration, arranged in accordance with at least some implementations of the present disclosure. As shown in FIG. 11, system 1100 may include a central processor 1101, an image processor 1102, a memory 1103, and camera array 101. Also as shown, image processor 1102 may include or implement ROI detector 102, semantic conversion module 103, homography registration module 104, and 3D structure curvature approximation module 105. In the example of system 1100, memory 1103 may input images, region of interest data, portion of image data, homography parameters, change in homography parameters, regularization parameters, trust region data, foreground likelihood data, camera array parameter data, or any other data discussed herein.

As shown, in some examples, one or more or portions of ROI detector 102, semantic conversion module 103, homography registration module 104, and 3D structure curvature approximation module 105 are implemented via image processor 1102. In other examples, one or more or portions of ROI detector 102, semantic conversion module 103, homography registration module 104, and 3D structure curvature approximation module 105 are implemented via central processor 1101, an image processing unit, an image processing pipeline, an image signal processor, or the like. In some examples, one or more or portions of ROI detector 102, semantic conversion module 103, homography registration module 104, and 3D structure curvature approximation module 105 are implemented in hardware as a system-on-a-chip (SoC). In some examples, one or more or portions of ROI detector 102, semantic conversion module 103, homography registration module 104, and 3D structure curvature approximation module 105 are implemented in hardware via a FPGA.

Image processor 1102 may include any number and type of image or graphics processing units that may provide the operations as discussed herein. Such operations may be implemented via software or hardware or a combination thereof. For example, image processor 1102 may include circuitry dedicated to manipulate and/or analyze images obtained from memory 1103. Central processor 1101 may include any number and type of processing units or modules that may provide control and other high level functions for system 1100 and/or provide any operations as discussed herein. Memory 1103 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1103 may be implemented by cache memory. In an embodiment, one or more or portions of ROI detector 102, semantic conversion module 103, homography registration module 104, and 3D structure curvature approximation module 105 are implemented via an execution unit (EU) of image processor 1102. The EU may include, for example, programmable logic or circuitry such as a logic core or cores that may provide a wide array of programmable logic functions. In an embodiment, one or more or portions of ROI detector 102, semantic conversion module 103, homography registration module 104, and 3D structure curvature approximation module 105 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 10, process 1000 begins at operation 1001, where a color region of interest (ROI) from a source image and a color image portion from a target image are received for processing. In some embodiments, the color image portion is larger than the color ROI so a target region mapped from the source ROI may search for a match within the portion. In some embodiments, the source image and the target image comprise oblique view images of a scene obtained from first and second cameras, respectively, of an array of cameras, the oblique view having a view of less than 22° from a horizon.

Processing continues at operation 1002, where the color ROI and the color image portion are converted to a foreground likelihood ROI and a foreground likelihood image portion, the foreground likelihood ROI and image portion including a likelihood each pixel is a foreground pixel. In some embodiments, converting the color ROI and the color image portion to the foreground likelihood ROI and the foreground likelihood image portion, respectively, includes applying automatic thresholding to generate binary foreground and binary background pixels and applying a distance transform to adjust the binary background pixels. In some embodiments, converting the color ROI and the color image portion to the foreground likelihood ROI and the foreground likelihood image portion, respectively, includes application of a segmentation neural network or Gaussian mixture model. As discussed, in place of foreground likelihood, any suitable semantic values that categorize pixels into class labels or class likelihood labels, etc. Furthermore, in some embodiments, the binary foreground values may be converted to foreground likelihood using Gaussian blurring or other techniques.

Processing continues at operation 1003, where a number of first iterations are applied to converge homography parameters to map the foreground likelihood ROI to a target region of the foreground likelihood image portion such that the first iterations allow variation in translation parameters of the homography parameters and block variation in rotation parameters and perspective parameters of the homography parameters. In some embodiments, the first iterations to block variation in the rotation parameters and the perspective parameters by applying rotation regularization parameters and perspective regularization parameters to deter variation in rotation parameters and perspective parameters in the change in the homography parameters. For example, the rotation and perspective regularization parameters may be larger than translation regularization parameters by an order of magnitude or two orders of magnitude.

Processing continues at operation 1004, where a number of second iterations, subsequent to the first iterations, are applied to converge the homography parameters such that the second iterations allow variation in the translation parameters, the rotation parameters, and the perspective parameters. In some embodiments, the blocking of the translation and rotation parameters may be removed by reducing the rotation and perspective regularization parameters.

In some embodiments, process 1000 further includes applying a number of third iterations, subsequent to the first iterations and prior to the second iterations, to converge a plurality of homography parameters such that the third iterations allow variation in the translation parameters and the rotation parameters and block variation in the perspective parameters. For example, the perspective regularization parameters may remain unchanged while the rotation regularization parameters are reduced during the third iterations.

In some embodiments, a current iteration of the first and second iterations includes generating a change in the homography parameters based on a first order approximation of an error between the foreground likelihood ROI and candidate target image regions and a regularization of the change in the homography parameters. In some embodiments, In some embodiments, the current iteration includes a minimization of a sum of the first order approximation of error and the regularization such that the regularization applies regularization parameters and a trust region parameter to the change in the homography parameters at the current iteration.

In some embodiments, a current iteration of the first or second iterations includes generating a change in the homography parameters based on a first order approximation of an error between the foreground likelihood source image ROI and candidate target image regions, determining a first order approximation of a cost improvement using the change in the homography parameters and a true cost improvement using the change in the homography parameter, and determining a ratio of the true cost improvement to the first order approximation of the cost improvement. In some embodiments, in response to the ratio exceeding a first threshold, the ratio being less than a second threshold greater than the first threshold, and the true cost improvement indicating an error reduction in the current iteration, the change in the homography parameters are applied at a subsequent iteration. In some embodiments, in response to the ratio exceeding the second threshold, the current iteration further includes increasing a trust region parameter applied to a regularization of the change in the homography parameters and generating a second change in the homography parameters based on the increased trust region parameter. In some embodiments, in response to the ratio being less than a third threshold less than the first threshold or the true cost improvement indicating an error increase, the current iteration further includes decreasing a trust region parameter applied to a regularization of the change in the homography parameters and generating a second change in the homography parameters based on the decreased trust region parameter.

Processing continues at operation 1005, where resultant homography parameters are output and/or used to generate 3D structure normal vectors. The resultant homography parameters may be determined after a number of iterations has completed processing or after an error threshold has been met or the like. The resultant homography parameters may be used in a variety of contexts such as camera registration. In some embodiments, 3D structure normal vectors are generated by approximating a normal vector to a 3D structure in a scene corresponding to the source and target images based on the resultant homography parameters and locations and orientations of first and second cameras used to attain the source and target images, respectively Process 1000 may be repeated any number of times either in series or in parallel for any number of pairs of source and target image regions, portions, or patches, or the like. Process 1000 provides for registration between a source image region and a portion of a target image. Process 1000 may be implemented by any suitable device, system, apparatus, or platform such as those discussed herein. In an embodiment, process 1000 is implemented by an apparatus having a memory to source and target images, as well as any other discussed data structure, and a processor to perform operations 1001-1005. In an embodiment, the memory and the processor are implemented via a monolithic field programmable gate array integrated circuit. As used herein, the term monolithic indicates a device that is discrete from other devices, although it may be coupled to other devices for communication and power supply.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 12:
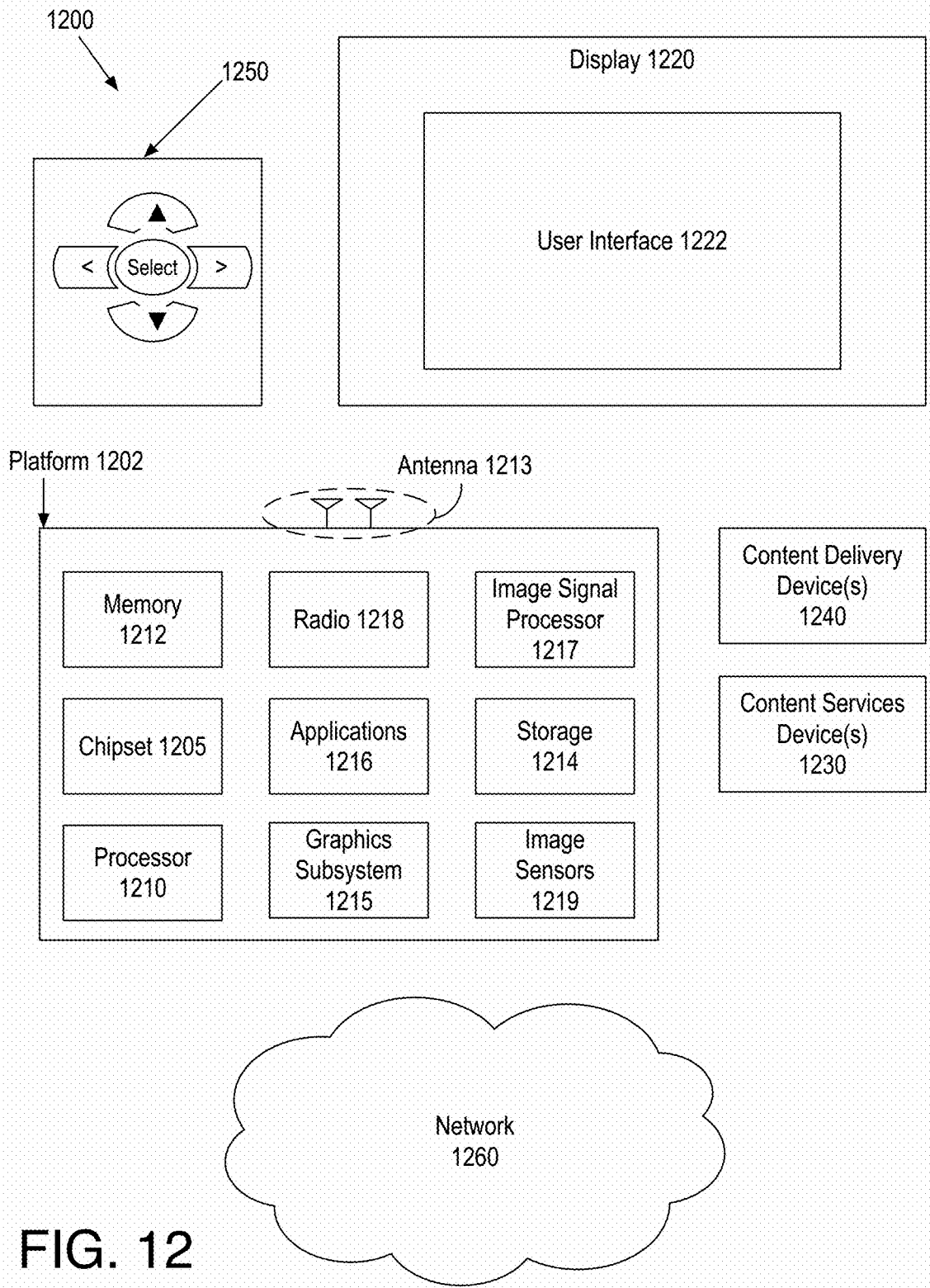
FIG. 12 is an illustrative diagram of an example system.

FIG. 12 is an illustrative diagram of an example system 1200, arranged in accordance with at least some implementations of the present disclosure. In various implementations, system 1200 may be a mobile device system although system 1200 is not limited to this context. For example, system 1200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), a surveillance camera, a surveillance system including a camera, and so forth.

In various implementations, system 1200 includes a platform 1202 coupled to a display 1220. Platform 1202 may receive content from a content device such as content services device(s) 1230 or content delivery device(s) 1240 or other content sources such as image sensors 1219. For example, platform 1202 may receive image data as discussed herein from image sensors 1219 or any other content source. A navigation controller 1250 including one or more navigation features may be used to interact with, for example, platform 1202 and/or display 1220. Each of these components is described in greater detail below.

In various implementations, platform 1202 may include any combination of a chipset 1205, processor 1210, memory 1212, antenna 1213, storage 1214, graphics subsystem 1215, applications 1216, image signal processor 1217 and/or radio 1218. Chipset 1205 may provide intercommunication among processor 1210, memory 1212, storage 1214, graphics subsystem 1215, applications 1216, image signal processor 1217 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Image signal processor 1217 may be implemented as a specialized digital signal processor or the like used for image processing. In some examples, image signal processor 1217 may be implemented based on a single instruction multiple data or multiple instruction multiple data architecture or the like. In some examples, image signal processor 1217 may be characterized as a media processor. As discussed herein, image signal processor 1217 may be implemented based on a system on a chip architecture and/or based on a multi-core architecture.

Graphics subsystem 1215 may perform processing of images such as still or video for display. Graphics subsystem 1215 may be a graphics processing unit (GPU) or a visual processing unit (VPU), for example. An analog or digital interface may be used to communicatively couple graphics subsystem 1215 and display 1220. For example, the interface may be any of a High-Definition Multimedia Interface, DisplayPort, wireless HDMI, and/or wireless HD compliant techniques. Graphics subsystem 1215 may be integrated into processor 1210 or chipset 1205. In some implementations, graphics subsystem 1215 may be a stand-alone device communicatively coupled to chipset 1205.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any television type monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

Image sensors 1219 may include any suitable image sensors that may provide image data based on a scene. For example, image sensors 1219 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1219 may include any device that may detect information of a scene to generate image data.

In various implementations, content services device(s) 1230 may include a cable television box, personal computer, network, telephone, Internet enabled devices or appliance capable of delivering digital information and/or content, and any other similar device capable of uni-directionally or bi-directionally communicating content between content providers and platform 1202 and/display 1220, via network 1260 or directly. It will be appreciated that the content may be communicated uni-directionally and/or bi-directionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of navigation controller 1250 may be used to interact with user interface 1222, for example. In various embodiments, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1250 may be replicated on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In various embodiments, navigation controller 1250 may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various embodiments, platform 1202 and display 1220 may be an integrated unit. Display 1220 and content service device(s) 1230 may be integrated, or display 1220 and content delivery device(s) 1240 may be integrated, for example. These examples are not meant to limit the present disclosure.

In various embodiments, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
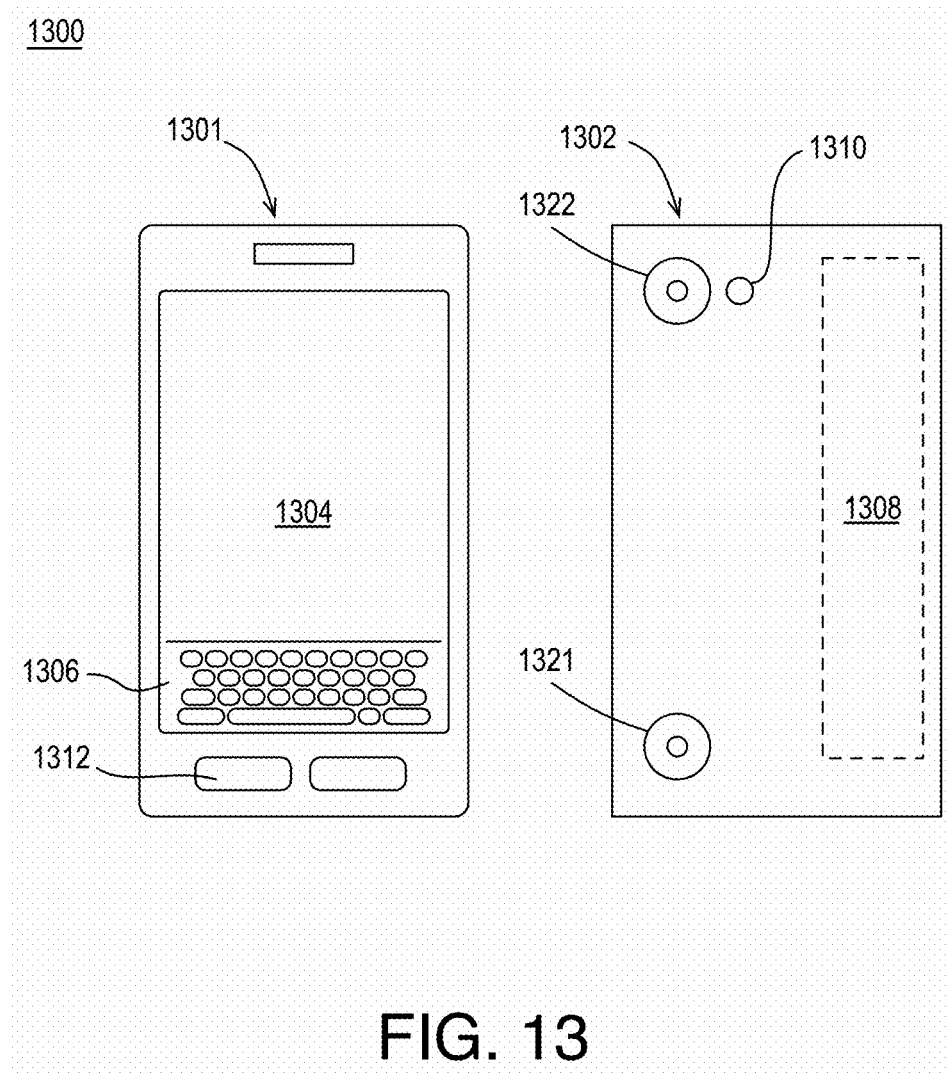
FIG. 13 illustrates an example device, all arranged in accordance with at least some implementations of the present disclosure.

As described above, system 1200 may be embodied in varying physical styles or form factors. FIG. 13 illustrates an example small form factor device 1300, arranged in accordance with at least some implementations of the present disclosure. In some examples, system 1200 may be implemented via device 1300. In other examples, other systems, components, or modules discussed herein or portions thereof may be implemented via device 1300. In various embodiments, for example, device 1300 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 13, device 1300 may include a housing with a front 1301 and a back 1302. Device 1300 includes a display 1304, an input/output (I/O) device 1306, a color camera 1321, a color camera 1322, an infrared transmitter 1323, and an integrated antenna 1308. In some embodiments, color camera 1321 and color camera 1322 attain planar images as discussed herein. In some embodiments, device 1300 does not include color camera 1321 and 1322 and device 1300 attains input image data (e.g., any input image data discussed herein) from another device. Device 1300 also may include navigation features 1312. I/O device 1306 may include any suitable I/O device for entering information into a mobile computing device. Examples for I/O device 1306 may include an alphanumeric keyboard, a numeric keypad, a touch pad, input keys, buttons, switches, microphones, speakers, voice recognition device and software, and so forth. Information also may be entered into device 1300 by way of microphone (not shown), or may be digitized by a voice recognition device. As shown, device 1300 may include color cameras 1321, 1322, and a flash 1310 integrated into back 1302 (or elsewhere) of device 1300. In other examples, color cameras 1321, 1322, and flash 1310 may be integrated into front 1301 of device 1300 or both front and back sets of cameras may be provided. Color cameras 1321, 1322 and a flash 1310 may be components of a camera module to originate color image data with IR texture correction that may be processed into an image or streaming video that is output to display 1304 and/or communicated remotely from device 1300 via antenna 1308 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for performing image registration comprises receiving a color region of interest (ROI) from a source image and a color image portion from a target image, converting the color ROI and the color image portion to a foreground likelihood ROI and a foreground likelihood image portion, the foreground likelihood ROI and image portion comprising a likelihood each pixel comprises a foreground pixel, applying a plurality of first iterations to converge a plurality of homography parameters to map the foreground likelihood ROI to a target region of the foreground likelihood image portion, wherein the first iterations allow variation in translation parameters of the homography parameters and block variation in rotation parameters and perspective parameters of the homography parameters, applying a plurality of second iterations, subsequent to the first iterations, to converge the homography parameters, wherein the second iterations allow variation in the translation parameters, the rotation parameters, and the perspective parameters, and outputting resultant homography parameters based on the first and second iterations.

In one or more second embodiments, further to the first embodiment, a current iteration of the first and second iterations comprises generating a change in the homography parameters based on a first order approximation of an error between the foreground likelihood ROI and candidate target image regions and a regularization of the change in the homography parameters In one or more third embodiments, further to the first or second embodiments, the current iteration comprises a minimization of a sum of the first order approximation of error and the regularization, wherein the regularization applies regularization parameters and a trust region parameter to the change in the homography parameters at the current iteration.

In one or more fourth embodiments, further to any of the first through third embodiments, the first iterations to block variation in the rotation parameters and the perspective parameters comprises applying rotation regularization parameters and perspective regularization parameters to deter variation in rotation parameters and perspective parameters in the change in the homography parameters.

In one or more fifth embodiments, further to any of the first through fourth embodiments, the method further comprises applying a plurality of third iterations, subsequent to the first iterations and prior to the second iterations, to converge a plurality of homography parameters, wherein the third iterations allow variation in the translation parameters and the rotation parameters and block variation in the perspective parameters.

In one or more sixth embodiments, further to any of the first through fifth embodiments, a current iteration of the first or second iterations comprises generating a change in the homography parameters based on a first order approximation of an error between the foreground likelihood source image ROI and candidate target image regions, determining a first order approximation of a cost improvement using the change in the homography parameters and a true cost improvement using the change in the homography parameter, and determining a ratio of the true cost improvement to the first order approximation of the cost improvement.

In one or more seventh embodiments, further to any of the first through sixth embodiments, in response to the ratio exceeding a first threshold, the ratio being less than a second threshold greater than the first threshold, and the true cost improvement indicating an error reduction in the current iteration, the change in the homography parameters are applied at a subsequent iteration.

In one or more eighth embodiments, further to any of the first through seventh embodiments, in response to the ratio exceeding the second threshold, the current iteration further comprises increasing a trust region parameter applied to a regularization of the change in the homography parameters and generating a second change in the homography parameters based on the increased trust region parameter.

In one or more ninth embodiments, further to any of the first through eighth embodiments, in response to the ratio being less than a third threshold less than the first threshold or the true cost improvement indicating an error increase, the current iteration further comprises decreasing a trust region parameter applied to a regularization of the change in the homography parameters and generating a second change in the homography parameters based on the decreased trust region parameter.

In one or more tenth embodiments, further to any of the first through ninth embodiments, converting the color ROI and the color image portion to the foreground likelihood ROI and the foreground likelihood image portion, respectively, comprises applying automatic thresholding to generate binary foreground and binary background pixels and applying a distance transform to adjust the binary background pixels.

In one or more eleventh embodiments, further to any of the first through tenth embodiments, the method further comprises approximating a normal vector to a 3D structure in a scene corresponding to the source and target images based on the resultant homography parameters and locations and orientations of first and second cameras used to attain the source and target images, respectively.

In one or more twelfth embodiments, further to any of the first through eleventh embodiments, the source image and the target image comprise oblique view images of a scene obtained from first and second cameras, respectively, of an array of cameras, the oblique view having a view of less than 22° from a horizon.

In one or more thirteenth embodiments, a device or system includes a memory and a processor to perform a method according to any one of the above embodiments.

In one or more fourteenth embodiments, at least one machine readable medium includes a plurality of instructions that in response to being executed on a computing device, cause the computing device to perform a method according to any one of the above embodiments.

In one or more fifteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An apparatus for registering images comprising:
a memory to store a color region of interest (ROI) from a source image and a color image portion from a target image; and
one or more processors coupled to the memory, the one or more processors to:
convert the color ROI and the color image portion to a foreground likelihood ROI and a foreground likelihood image portion, the foreground likelihood ROI and image portion comprising a likelihood each pixel comprises a foreground pixel;
apply a plurality of first iterations to converge a plurality of homography parameters to map the foreground likelihood ROI to a target region of the foreground likelihood image portion, wherein the first iterations allow variation in translation parameters of the homography parameters and block variation in rotation parameters and perspective parameters of the homography parameters;
apply a plurality of second iterations, subsequent to the first iterations, to converge the homography parameters, wherein the second iterations allow variation in the translation parameters, the rotation parameters, and the perspective parameters; and
output resultant homography parameters based on the first and second iterations.

2. The apparatus of claim 1, wherein a current iteration of the first and second iterations comprises generating a change in the homography parameters based on a first order approximation of an error between the foreground likelihood ROI and candidate target image regions and a regularization of the change in the homography parameters.

3. The apparatus of claim 2, wherein the current iteration comprises a minimization of a sum of the first order approximation of error and the regularization, wherein the regularization applies regularization parameters and a trust region parameter to the change in the homography parameters at the current iteration.

4. The apparatus of claim 2, wherein the first iterations to block variation in the rotation parameters and the perspective parameters comprises applying rotation regularization parameters and perspective regularization parameters to deter variation in rotation parameters and perspective parameters in the change in the homography parameters.

5. The apparatus of claim 1, the one or more processors to:
apply a plurality of third iterations, subsequent to the first iterations and prior to the second iterations, to converge a plurality of homography parameters, wherein the third iterations allow variation in the translation parameters and the rotation parameters and block variation in the perspective parameters.

6. The apparatus of claim 1, wherein the one or more processors to perform a current iteration of the first or second iterations comprises the one or more processors to:
generate a change in the homography parameters based on a first order approximation of an error between the foreground likelihood ROI and candidate target image regions;
determine a first order approximation of a cost improvement using the change in the homography parameters and a true cost improvement using the change in the homography parameters; and
determine a ratio of the true cost improvement to the first order approximation of the cost improvement.

7. The apparatus of claim 6, wherein, in response to the ratio exceeding a first threshold, the ratio being less than a second threshold greater than the first threshold, and the true cost improvement indicating an error reduction in the current iteration, the change in the homography parameters are applied at a subsequent iteration.

8. The apparatus of claim 7, wherein, in response to the ratio exceeding the second threshold, the current iteration comprises the one or more processors to:
increase a trust region parameter applied to a regularization of the change in the homography parameters; and
generate a second change in the homography parameters based on the increased trust region parameter.

9. The apparatus of claim 7, wherein, in response to the ratio being less than a third threshold less than the first threshold or the true cost improvement indicating an error increase, the current iteration further comprises the one or more processors to:
decrease a trust region parameter applied to a regularization of the change in the homography parameters; and
generate a second change in the homography parameters based on the decreased trust region parameter.

10. The apparatus of claim 1, wherein the one or more processors to convert the color ROI and the color image portion to the foreground likelihood ROI and the foreground likelihood image portion, respectively, comprises the one or more processors to apply automatic thresholding to generate binary foreground and binary background pixels and to apply a distance transform to adjust the binary background pixels.

11. The apparatus of claim 1, the one or more processors to:
approximate a normal vector to a 3D structure in a scene corresponding to the source and target images based on the resultant homography parameters and locations and orientations of first and second cameras used to attain the source and target images, respectively.

12. The apparatus of claim 1, wherein the source image and the target image comprise oblique view images of a scene obtained from first and second cameras, respectively, of an array of cameras, the oblique view having a view of less than 22° from a horizon.

13. A method for performing image registration comprising:
receiving a color region of interest (ROI) from a source image and a color image portion from a target image;
converting the color ROI and the color image portion to a foreground likelihood ROI and a foreground likelihood image portion, the foreground likelihood ROI and image portion comprising a likelihood each pixel comprises a foreground pixel;

applying a plurality of first iterations to converge a plurality of homography parameters to map the foreground likelihood ROI to a target region of the foreground likelihood image portion, wherein the first iterations allow variation in translation parameters of the homography parameters and block variation in rotation parameters and perspective parameters of the homography parameters;

applying a plurality of second iterations, subsequent to the first iterations, to converge the homography parameters, wherein the second iterations allow variation in the translation parameters, the rotation parameters, and the perspective parameters; and outputting resultant homography parameters based on the first and second iterations.

14. The method of claim 13, further comprising:
applying a plurality of third iterations, subsequent to the first iterations and prior to the second iterations, to converge a plurality of homography parameters, wherein the third iterations allow variation in the translation parameters and the rotation parameters and block variation in the perspective parameters.

15. The method of claim 13, wherein a current iteration of the first or second iterations comprises:
generating a change in the homography parameters based on a first order approximation of an error between the foreground likelihood ROI and candidate target image regions;
determining a first order approximation of a cost improvement using the change in the homography parameters and a true cost improvement using the change in the homography parameters; and
determining a ratio of the true cost improvement to the first order approximation of the cost improvement.

16. The method of claim 15, wherein, in response to the ratio exceeding a first threshold, the ratio being less than a second threshold greater than the first threshold, and the true cost improvement indicating an error reduction in the current iteration, the change in the homography parameters are applied at a subsequent iteration.

17. At least one non-transitory machine readable medium comprising a plurality of instructions that, in response to being executed on a computing device, cause the computing device to perform image registration by:
receiving a color region of interest (ROI) from a source image and a color image portion from a target image;
converting the color ROI and the color image portion to a foreground likelihood ROI and a foreground likelihood image portion, the foreground likelihood ROI and image portion comprising a likelihood each pixel comprises a foreground pixel;

applying a plurality of first iterations to converge a plurality of homography parameters to map the foreground likelihood ROI to a target region of the foreground likelihood image portion, wherein the first iterations allow variation in translation parameters of the homography parameters and block variation in rotation parameters and perspective parameters of the homography parameters;

applying a plurality of second iterations, subsequent to the first iterations, to converge the homography parameters, wherein the second iterations allow variation in the translation parameters, the rotation parameters, and the perspective parameters; and outputting resultant homography parameters based on the first and second iterations.

18. The non-transitory machine readable medium of claim 17, further comprising instructions that, in response to being executed on the computing device, cause the computing device to perform image registration by:
applying a plurality of third iterations, subsequent to the first iterations and prior to the second iterations, to converge a plurality of homography parameters, wherein the third iterations allow variation in the translation parameters and the rotation parameters and block variation in the perspective parameters.

19. The non-transitory machine readable medium of claim 17, wherein a current iteration of the first or second iterations comprises:
generating a change in the homography parameters based on a first order approximation of an error between the foreground likelihood ROI and candidate target image regions;
determining a first order approximation of a cost improvement using the change in the homography parameters and a true cost improvement using the change in the homography parameters; and
determining a ratio of the true cost improvement to the first order approximation of the cost improvement.

20. The non-transitory machine readable medium of claim 19, wherein, in response to the ratio exceeding a first threshold, the ratio being less than a second threshold greater than the first threshold, and the true cost improvement indicating an error reduction in the current iteration, the change in the homography parameters are applied at a subsequent iteration.

* * * * *